(12) United States Patent
Oizumi et al.

(10) Patent No.: US 10,966,197 B2
(45) Date of Patent: *Mar. 30, 2021

(54) TERMINAL APPARATUS, BASE STATION APPARATUS, RECEPTION METHOD AND TRANSMISSION METHOD

(71) Applicant: Sun Patent Trust, New York, NY (US)

(72) Inventors: Toru Oizumi, Kanagawa (JP); Alexander Golitschek Edler von Elbwart, Darmstadt (DE)

(73) Assignee: Sun Patent Trust, New York, NY (US)

( * ) Notice: Subject to any disclaimer, the term of this patent is extended or adjusted under 35 U.S.C. 154(b) by 46 days.

This patent is subject to a terminal disclaimer.

(21) Appl. No.: 16/280,721

(22) Filed: Feb. 20, 2019

(65) Prior Publication Data

US 2019/0182832 A1 Jun. 13, 2019

Related U.S. Application Data

(63) Continuation of application No. 15/395,737, filed on Dec. 30, 2016, now Pat. No. 10,257,826, which is a
(Continued)

(30) Foreign Application Priority Data

Oct. 26, 2012 (JP) .............................. JP2012-236768

(51) Int. Cl.
*H04W 72/04* (2009.01)
*H04L 1/18* (2006.01)
(Continued)

(52) U.S. Cl.
CPC ....... *H04W 72/0446* (2013.01); *H04L 1/1825* (2013.01); *H04L 27/26* (2013.01);
(Continued)

(58) Field of Classification Search
CPC ................................................ H04W 72/0446
See application file for complete search history.

(56) References Cited

U.S. PATENT DOCUMENTS 8,958,349 B2 2/2015 Wang et al.
2009/0135748 A1 5/2009 Lindoff et al.
(Continued)

FOREIGN PATENT DOCUMENTS

| JP | 2009-272827 A | 11/2009 |
| WO | 2009/063001 A2 | 5/2009 |
| WO | 2012/106840 A1 | 8/2012 |

OTHER PUBLICATIONS

3GPP TS 36.211 V10.1.0, "3rd Generation Partnership Project; Technical Specification Group Radio Access Network; Evolved Universal Terrestrial Radio Access (E-UTRA); Physical Channels and Modulation (Release 10)," Mar. 2011, 103 pages.
(Continued)

*Primary Examiner* — John D Blanton
(74) *Attorney, Agent, or Firm* — Seed IP Law Group LLP

(57) ABSTRACT

Provided is a terminal apparatus that, when two terminals having mutually different subframe structure patterns are coexistent, can suppress DCI scheduling constraints of those terminals in a base station. In a terminal, a signal separation unit separates, from a received signal, both a response signal assigned to a first resource determined on the basis of a number of resources associated with the first subframes in which the signal was received and downstream control information assigned to a second resource. It should be noted that at a timing when both a first structure pattern that has been set in the terminal and a second structure pattern that has been set in another terminal that cannot change the setting of the structure pattern are the first subframes, the
(Continued)

signal separation unit uses a number of resources associated with the first subframes of the second structure pattern.

24 Claims, 16 Drawing Sheets

Related U.S. Application Data continuation of application No. 14/430,137, filed as application No. PCT/JP2013/005944 on Oct. 4, 2013, now Pat. No. 9,826,526.

(51) Int. Cl.
| | | |
|---|---|---|
| H04W 72/02 | (2009.01) | |
| H04W 72/12 | (2009.01) | |
| H04L 27/26 | (2006.01) | |
| H04L 12/24 | (2006.01) | |
| H04W 88/02 | (2009.01) | |
| H04W 88/08 | (2009.01) | |

(52) U.S. Cl.
CPC ......... *H04L 41/0803* (2013.01); *H04W 72/02* (2013.01); *H04W 72/042* (2013.01); *H04W 72/12* (2013.01); *H04W 72/04* (2013.01); *H04W 88/02* (2013.01); *H04W 88/08* (2013.01)

(56) References Cited

U.S. PATENT DOCUMENTS

| | | | |
|---|---|---|---|
| 2011/0116465 A1 | 5/2011 | Miki et al. | |
| 2011/0176461 A1* | 7/2011 | Astely | H04B 7/2656 370/280 |
| 2011/0211503 A1* | 9/2011 | Che | H04W 72/042 370/280 |
| 2012/0120855 A1 | 5/2012 | Torsner et al. | |
| 2012/0230245 A1 | 9/2012 | Ostergaard et al. | |
| 2013/0194980 A1* | 8/2013 | Yin | H04L 1/1607 370/280 |
| 2013/0242815 A1 | 9/2013 | Wang et al. | |
| 2013/0336299 A1* | 12/2013 | Lee | H04L 5/0055 370/336 |
| 2015/0043392 A1* | 2/2015 | Susitaival | H04W 72/0446 370/280 |
| 2015/0195791 A1 | 7/2015 | Jiang et al. | |
| 2015/0222396 A1* | 8/2015 | Yan | H04L 1/1812 370/280 |

OTHER PUBLICATIONS

3GPP TS 36.212 V10.1.0, "3rd Generation Partnership Project; Technical Specification Group Radio Access Network; Evolved Universal Terrestrial Radio Access (E-UTRA); Multiplexing and channel coding (Release 10)," Mar. 2011, 76 pages.
3GPP TS 36.213 V10.1.0, "3rd Generation Partnership Project; Technical Specification Group Radio Access Network; Evolved Universal Terrestrial Radio Access (E-UTRA); Physical layer procedures (Release 10)," Mar. 2011, 115 pages.
Communication pursuant to Article 93(3) EPC, dated Jan. 3, 2018, for corresponding European Patent Application No. 13 849 040.4-1857, 7 pages.
Extended European Search Report dated Sep. 16, 2015, for corresponding EP Application No. 13849040.4-1857 / 2914032, 8 pages.
International Search Report dated Jan. 7, 2014, for corresponding International Application No. PCT/JP2013/005944, 3 pages.
NTT DoCoMo, Mitsubishi Electric, NEC, Sharp, "Semi-static Configuration of Non-adaptive and Adaptive HARQ in E-UTRA Downlink," R1-074811(Originally R1-073698), 3GPP TSG RAN WG1 Meeting #51, Agenda Item: 6.2.3, Jeju, Korea, Nov. 5-9, 2007, 2 pages.
Pantech, "PUSCH HARQ/scheduling timing in inter-band CA with different TDD UL-DL configuration," R1-122443, 3GPP TSG RAN1 #69, Agenda Item: 7.2.1.5, Prague, Czech Republic, May 21-25, 2012, 5 pages.
Samsung, "Enhancing PDCCH Capacity for CA through Compact DCI Formats", R1-113072, 3GPP TSG RAN WG1 #66bis, Agenda item: 7.2.1.1, Zhuhai, China, Oct. 10-14, 2011, 3 pages.
Texas Instruments, "PDCCH and PHICH Multiplexing Issues", R1-074684, 3GPP TSG RAN WG1 51, Agenda Item: 6.2.3, Jeju, Korea, Nov. 5-9, 2007, 4 pages.

\* cited by examiner

Factor of $m_i$

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | 2 | 1 | – | – | – | 2 | 1 | – | – | – |
| 1 | 0 | 1 | – | – | 1 | 0 | 1 | – | – | 1 |
| 2 | 0 | 0 | – | 1 | 0 | 0 | 0 | – | 1 | 0 |
| 3 | 1 | 0 | – | – | – | 0 | 0 | 0 | 1 | 1 |
| 4 | 0 | 0 | – | – | 0 | 0 | 0 | 0 | 1 | 1 |
| 5 | 0 | 0 | – | 0 | 0 | 0 | 0 | 0 | 1 | 0 |
| 6 | 1 | 1 | – | – | – | 1 | 1 | – | – | 1 |

FIG. 3A

PUSCH-PHICH timing

| TDD UL/DL Configuration | subframe number n | | | | | | | | | | $I_{PHICH}$ |
|---|---|---|---|---|---|---|---|---|---|---|---|
| | 0 | 1 | 2 | 3 | 4 | 5 | 6 | 7 | 8 | 9 | |
| 0 | 7 | 4 | | | | 7 | 4 | | | | 0 |
| 1 | 6 | | | | 6 | | | | | 6 | 1 |
| 2 | | | | 6 | | | | | 6 | | 0 |
| 3 | 6 | | | | 6 | | | | 6 | 6 | 0 |
| 4 | | | | | 6 | | | | 6 | 6 | 0 |
| 5 | | | | | | | | | 6 | | 0 |
| 6 | 6 | 4 | | | | 7 | 4 | | | 6 | 0 |

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | 2 | 1 | - | - | - | 2 | 1 | - | - | - |
| 1 | 0 | 1 | - | - | 1 | 0 | 1 | - | - | 1 |
| 2 | 0 | 0 | - | 1 | 0 | 0 | 0 | - | 1 | 0 |
| 3 | 1 | 0 | - | - | - | 0 | 0 | 0 | 1 | 1 |
| 4 | 0 | 0 | - | - | 1 | 0 | 0 | 0 | 1 | 1 |
| 5 | 0 | 0 | - | 1 | 0 | 0 | 0 | 0 | 1 | 0 |
| 6 | 1 | 1 | - | - | - | 1 | 1 | - | - | 1 |
| Maximum | | 1 | | 1 | 1 | | 1 | | 1 | 1 |

FOR LEGACY TERMINAL
FOR TDD eIMTA TERMINAL 1
FOR TDD eIMTA TERMINAL 2

TERMINAL APPARATUS, BASE STATION APPARATUS, RECEPTION METHOD AND TRANSMISSION METHOD

BACKGROUND

Technical Field

The present invention relates to a terminal apparatus, a base station apparatus, a reception method and a transmission method.

Description of the Related Art

3GPP LTE adopts OFDMA (Orthogonal Frequency Division Multiple Access) as a downlink communication scheme. In a radio communication system to which 3GPP LTE is applied, a base station (which may also be called "eNB") transmits a synchronization signal (Synchronization Channel: SCH) and broadcast signal (Broadcast Channel: BCH) using predetermined communication resources. A terminal (which may also be called "UE") captures SCH and thereby secures synchronization with the base station. The terminal then reads BCH information and thereby acquires a parameter specific to the base station (e.g., frequency bandwidth) (see NPLs 1, 2 and 3).

After completion of the acquisition of the parameter specific to the base station, the terminal sends a connection request to the base station and thereby establishes communication with the base station. The base station transmits control information to the terminal with which communication has been established via a downlink control channel such as PDCCH (Physical Downlink Control Channel) as appropriate.

The terminal then performs "blind detection" of a plurality of pieces of control information (which may also be called "downlink control information (DCI)") included in the received PDCCH signal. That is, the control information includes a CRC (Cyclic Redundancy Check) portion and this CRC portion is masked with a terminal ID of the transmission target terminal by the base station. Therefore, the terminal cannot determine whether or not the received control information is control information intended for the terminal until the terminal demasks the CRC portion with the terminal ID of the terminal itself. When the demasking result shows that CRC calculation is OK, it is determined in this blind detection that the control information is intended for the terminal itself. The downlink control information includes DL (downlink) assignment indicating assignment information of downlink data and UL (uplink) grant indicating assignment information of uplink data, for example.

Next, an uplink retransmission control method in 3GPP LTE will be described. In LTE, UL grant which is assignment information of uplink data is transmitted to the terminal by PDCCH. Here, in an FDD (Frequency Division Duplex) system, a UL grant indicates resource assignment within a target subframe which is the fourth subframe from the subframe in which the UL grant is transmitted.

Meanwhile, in a TDD (Time Division Duplex) system, a UL grant indicates resource assignment within a target subframe which is the fourth or after the fourth subframe from the subframe in which the UL grant is transmitted. This will be described more specifically using FIG. 1. In the TDD system, a downlink component carrier (which may also be called "downlink CC (Component Carrier)") and an uplink component carrier (which may also be called "uplink CC") are in the same frequency band, and the TDD system realizes downlink communication and uplink communication by switching between downlink and uplink in a time-division manner. For this reason, in the TDD system, a downlink component carrier can also be expressed as "downlink communication timing in a component carrier." An uplink component carrier can also be expressed as "uplink communication timing in a component carrier." Switching between the downlink component carrier and the uplink component carrier is performed based on a UL-DL configuration as shown in FIG. 1. The UL-DL configuration is indicated to the terminal by a broadcast signal called "SIB1 (System Information Block Type 1)" (SIB1 indication), the value thereof is the same throughout the entire system and the value is not expected to be changed frequently. In the UL-DL configuration shown in FIG. 1, timings in units of subframes (that is, units of 1 msec) are configured for downlink communication (DL: Downlink) and uplink communication (UL: Uplink) per frame (10 msec). The UL-DL configuration allows for building a communication system that can flexibly respond to requests for throughput for downlink communication and throughput for uplink communication by changing a subframe ratio between downlink communication and uplink communication. For example, FIG. 1 illustrates UL-DL configurations (Config#0 to 6) with different subframe ratios between downlink communication and uplink communication. In FIG. 1, a downlink communication subframe is represented by "D," an uplink communication subframe is represented by "U" and a special subframe is represented by "S." Here, the special subframe is a subframe when a downlink communication subframe is switched to an uplink communication subframe. In the special subframe, downlink data communication may also be performed as in the case of a downlink communication subframe. As shown by a solid line arrow in FIG. 1 (UL grant-PUSCH timing), a subframe to which uplink data for UL grant (PUSCH: Physical Uplink Shared Channel) is assigned is an uplink communication subframe which is the fourth or after the fourth subframe from the subframe in which the UL grant is indicated, and is uniquely defined as shown in FIG. 1.

Uplink retransmission control (UL retransmission control) supports non-adaptive retransmission in which retransmission data is assigned to the same resource as a resource to which uplink data is assigned at the time of the last transmission and adaptive retransmission in which retransmission data can be assigned to a resource different from a resource to which uplink data is assigned at the last transmission (e.g., see NPL 4). In non-adaptive retransmission, only PHICH (Physical Hybrid ARQ Indicator CHannel) for transmitting an ACK/NACK signal (response signal) in response to uplink data to the terminal is used as a channel for a retransmission control signal. When requesting the terminal to perform retransmission, the base station transmits a NACK to the terminal using PHICH and transmits an ACK using PHICH when not requesting the terminal to perform retransmission. In non-adaptive retransmission, since the base station can designate retransmission using only PHICH, non-adaptive retransmission has an advantage that the overhead of a control signal transmitted over downlink necessary to designate retransmission is small.

Here, in the FDD system, PHICH is indicated to the terminal using a resource within a target subframe which is the fourth subframe from the subframe in which uplink data is transmitted. Meanwhile, in the TDD system, PHICH is indicated to the terminal using a resource within a target subframe which is the fourth or after the fourth subframe from the subframe in which uplink data is transmitted. This will be described more specifically using FIG. 1. As shown by a broken line arrow (PUSCH-PHICH timing) in FIG. 1, a subframe to which ACK/NACK (PHICH) in response to uplink data (PUSCH) is assigned is a downlink communication subframe or special subframe 4 or more subframes after a subframe in which the uplink data is notified and is uniquely defined as shown in FIG. 1.

In adaptive retransmission, the base station transmits an ACK using PHICH while designating retransmission and a retransmission resource using UL grant for indicating resource assignment information. UL grant includes a bit called "NDI (New Data Indicator)" and this bit is binary having 0 or 1. The terminal compares an NDI of the received UL grant this time with an NDI of the last UL grant in the same retransmission process (HARQ (Hybrid ARQ) process), determines that new data has assigned when there is a change in the NDI or determines that retransmission data has been assigned when there is no change in the NDI. Since adaptive retransmission allows the amount of resources and MCS (Modulation and Coding Scheme) to be changed according to a required SINR (Signal-to-Interference and Noise power Ratio) of retransmission data, adaptive retransmission has an advantage that frequency utilization efficiency improves.

Since a CRC (Cyclic Redundancy Check) is added to UL grant, a received signal with UL grant has higher reliability than PHICH. For this reason, when the terminal receives PHICH and UL grant, the terminal follows an instruction of UL grant.

FIG. 2 shows an example of a procedure for UL retransmission control in the terminal. In FIG. 2, in step (hereinafter abbreviated as "ST") 11, the terminal determines whether or not there is UL grant. When there is UL grant (ST11: YES), the flow proceeds to ST12 and when there is no UL grant (ST11: NO), the flow proceeds to ST15.

In ST12, the terminal compares the NDI of UL grant this time with the NDI of the last UL grant in the same retransmission process and determines whether or not there is any change in the NDI. When there is a change in the NDI (ST12: YES), the flow proceeds to ST13 and when there is no change in the NDI (ST12: NO), the flow proceeds to ST14.

The terminal transmits new data to the base station in ST13 and transmits retransmission data to the base station through adaptive retransmission in ST14.

In ST15, the terminal determines whether or not PHICH is NACK. When PHICH is NACK (ST15: YES), the flow proceeds to ST16, and when PHICH is ACK (ST15: NO), the flow proceeds to ST17.

In ST16, the terminal transmits retransmission data to the base station through non-adaptive retransmission, and in ST17, suspending is applied, so that the terminal suspends retransmission control.

Next, a configuration of PHICH will be described.

It should be noted that in an LTE system and an LTE-A (LTE-Advanced) system which is an evolved version of LTE, one RB (Resource Block) is made up of 12 subcarriers×0.5 msec and a unit combining two RBs on the time domain is called "RB pair." Therefore, the RB pair is made up of 12 subcarriers×1 msec. When the RB pair represents a block of 12 subcarriers on the frequency domain, the RB pair may be simply called "RB." In addition, a unit of 1 subcarrier×1 OFDM symbol is called "1 RE (Resource Element)." 1 REG (Resource Element Group) is made up of 4 REs.

First, in coding of PHICH, ACK/NACK (1 bit) is subjected to three-time repetition. The number of PHICHs is one of {⅙, ½, 1, 2} times the number of RBs and is indicated by PBCH (Physical Broadcast Channel). The base station can transmit 8 PHICHs in 3 REGs (=12 REs) through code multiplexing and IQ multiplexing with SF (spreading factor)=4. The 8 PHICHs arranged on 3 REGs are called a PHICH group and expressed as "number of PHICH groups (that is, the number of resources) $N^{group}_{PHICH}$ is 8." In the FDD system, the number of PHICH groups $N^{group}_{PHICH}$ takes the same value in all subframes.

Meanwhile, in the TDD system, as shown in FIG. 3A, a factor ($m_i$) of number of PHICH groups is defined in each UL-DL configuration and each downlink communication subframe or special subframe. The total number of PHICH groups (=number of PHICH groups $N^{group}_{PHICH}$×factor $m_i$ of the number of PHICH groups) is changed for each subframe using this factor. In the FDD system, the factor of number of PHICH groups is always 1 irrespective of subframes.

The reason that the total number of PHICHs varies from one subframe to another in the TDD system will be described using FIG. 3B. FIG. 3B illustrates the number of subframes before a PHICH received by the terminal in subframe #n is associated with a PUSCH transmitted by the terminal. Blanks in FIG. 3B indicate that there are no PHICHs. For example, as shown in FIG. 3B, PHICH in subframe #1 of Config#0 is associated with PUSCH transmitted in subframe #7 which is 4 subframes earlier (see FIG. 1). In subframe #1 of Config#0, since PUSCH in one subframe is associated with PHICH in one subframe, factor $m_i$ of the number of PHICH groups is assumed to be 1 as in the case of the FDD system (see FIG. 3A). On the other hand, as shown in FIG. 3B, PHICH in subframe #0 of Config#0 is associated with PUSCHs transmitted in subframe #3 which is 7 subframes earlier and in subframe #4 which is 6 subframes earlier respectively. That is, in subframe #0 of Config#0, the terminal receives PHICHs corresponding to two PUSCHs. Thus, in subframe #0 of Config#0, twice as many resources for PHICH (hereinafter referred to as "PHICH resources") as those in subframe #1 of Config#0 are required, and therefore factor $m_i$ of the number of PHICH groups is considered to be 2 (see FIG. 3A).

In FIG. 3B, two PHICHs intended for the same terminal received in the same subframe (e.g., subframes #0 and 5) are distinguished by parameter $I_{PHICH}$. For example, in subframe #0 of Config#0, PHICH corresponding to PUSCH 7 subframes earlier corresponds to $I_{PHICH}=0$ and PHICH corresponding to PUSCH 6 subframes earlier corresponds to $I_{PHICH}=1$. The same applies to subframe #5 of Config#0. For PHICHs in other UL-DL configurations and subframes, $I_{PHICH}$ is always 0.

A PHICH resource is represented by a combination $\{n^{group}_{PHICH}, n^{seq}_{PHICH}\}$ of an index of the total number of PHICH resources $n^{group}_{PHICH}$ and an index of orthogonal sequence $n^{seq}_{PHICH}$. The index of the total number of PHICH resources $n^{group}_{PHICH}$ and the index of orthogonal sequence $n^{seq}_{PHICH}$ are expressed by following equations 1 and 2 respectively.

$$n^{group}_{PHICH} = (I_{PRB\_RA} + n_{DMRS}) \bmod N^{group}_{PHICH} + I_{PHICH} N^{group}_{PHICH} \quad \text{(Equation 1)}$$

$$n^{seq}_{PHICH} = (\lfloor I_{PRB\_RA}/N^{group}_{PHICH} \rfloor + n_{DMRS}) \bmod 2N^{PHICH}_{SF} \quad \text{(Equation 2)}$$

Here, $N^{PHICH}_{SF}$ is a spreading factor (SF) that varies depending on the length of a CP (Cyclic Prefix). $I_{PRB\_RA}$ is a minimum value of a PRB (Physical RB) index to which PUSCH corresponding to PHICH is assigned. Meanwhile, $n_{DMRS}$ is a cyclic shift value of DMRS (Demodulation Reference Signal) included in UL grant that indicates PUSCH corresponding to PHICH. Since $I_{PRB\_RA}$ and $n_{DMRS}$ depend on assignment of UL grant and PUSCH, a PHICH resource can be said to be implicitly indicated (implicit signaling) based on the assignment of UL grant and PUSCH. The determined PHICH resource is divided for every value of $I_{PHICH}$. For example, in subframe #0 of Config#0, PHICH corresponding to PUSCH 7 subframes earlier and PHICH corresponding to PUSCH 6 subframes earlier are designed such that the PHICH resources do not conflict with each other.

Mapping of PHICH depends on a cell ID. Therefore, it is difficult to control interference of PHICH with other cells and PHICH may interfere with PDCCH and/or CRS (Cell-specific Reference Signal) in other cells. All of 3 REGs making up PHICH may be arranged on OFDM symbol #0 (not shown) or 3 REGs may be arranged one for each of OFDM symbols #0, #1 and #2 as shown in FIG. 4. Information indicating which PHICH arrangement is used is indicated to the terminal using a broadcast signal.

The number of OFDM symbols (1 to 3) occupied by PDCCH is determined based on the value of CFI (Control Format Indicator) indicated by PCFICH (Physical Control Format Indicator Channel) arranged on OFDM symbol #0. Moreover, when detecting PDCCH, the terminal performs blind detection on some resources in resource regions except resources occupied by PCFICH, PHICH and reference signals (hereinafter may also be referred to as "PDCCH resources") of resource regions corresponding to the number of OFDM symbols indicated by CFI from OFDM symbol #0.

In the LTE-A system, studies are being carried out on changing UL-DL configuration (hereinafter referred to as "TDD eIMTA (enhancement for DL-UL Interference Management and Traffic Adaptation)," which may also be referred to as "dynamic TDD" or "flexible TDD"). Exemplary purposes of TDD eIMTA include provision of a service that meets the needs of users by flexible changes of a UL/DL ratio or reduction in power consumption at a base station by increasing the UL ratio in a time zone when traffic load is low. As a method of changing UL-DL configuration, the following methods are under study in accordance with the purpose of change: (1) method using indication of an SI (System Information) signaling base, (2) method using indication of an RRC (higher layer) signaling base, (3) method using indication of a MAC (Media Access Control layer) signaling base and (4) method using indication of an L1 (Physical Layer) signaling base.

Method (1) is to change the least frequent UL-DL configuration. Method (1) is suitable for a case where the purpose is to reduce power consumption at a base station by increasing the UL ratio, for example, in a time zone when traffic load is low (e.g., midnight or early morning). Method (4) is to change the most frequent UL-DL configuration change. The number of terminals connected is smaller in a small cell such as a pico cell than in a large cell such as a macro cell. In a pico cell, UL/DL traffic in the entire pico cell is determined depending on the level of UL/DL traffic in a small number of terminals connected to the pico cell. For this reason, UL/DL traffic in the pico cell fluctuates drastically with time. Thus, method (4) is suitable for a case where UL-DL configuration is changed to follow a time fluctuation of UL/DL traffic in a small cell such as a pico cell. Method (2) and method (3) are positioned between method (1) and method (4) and suitable for a case where UL-DL configuration is changed with medium frequency.

CITATION LIST

Non-Patent Literature

NPL 1
3GPP TS 36.211 V10.1.0, "Physical Channels and Modulation (Release 10)," March 2011
NPL 2
3GPP TS 36.212 V10.1.0, "Multiplexing and channel coding (Release 10)," March 2011
NPL 3
3GPP TS 36.213 V10.1.0, "Physical layer procedures (Release 10)," March 2011
NPL 4
R1-074811, "Semi-static Configuration of Non-adaptive and Adaptive HARQ in E-UTRA Downlink"

BRIEF SUMMARY

Technical Problem

A case will be considered where a terminal using an SIB1-indicated UL-DL configuration (hereinafter may be referred to as "non-TDD eIMTA terminal" or "legacy terminal") coexists with a terminal that supports TDD eIMTA using UL-DL configuration which is different from the SIB1-indicated UL-DL configuration (hereinafter may be referred to as "TDD eIMTA terminal").

As shown in FIG. 3B, the LTE system and LTE-A system define PUSCH timing corresponding to PHICH for each UL-DL configuration (timing relating to uplink retransmission control). Moreover, as shown in FIG. 3A, factor ($m_i$) of the number of PHICH groups is defined in association with PHICH reception timing in a terminal. Therefore, the timing relating to uplink retransmission control and a factor of the number of PHICH groups may differ between a legacy terminal using SIB1-indicated UL-DL configuration and a TDD eIMTA terminal using UL-DL configuration which is different from the SIB1-indicated UL-DL configuration.

FIGS. 5A and 5B illustrate an example of a case where the factor of the number of PHICH groups differs between the legacy terminal and the TDD eIMTA terminal.

FIG. 5A shows an example of a case where Config#0 is set in the legacy terminal and Config#2 is set in the TDD eIMTA terminal. That is, the factor ($m_i$) of the number of PHICH groups corresponding to Config#0 shown in FIG. 3A is defined in the legacy terminal for every subframe and the factor ($m_i$) of the number of PHICH groups corresponding to Config#2 shown in FIG. 3A is defined in the TDD eIMTA terminal for every subframe.

Here, attention is focused on factors of the numbers of PHICH groups in subframes (SF)#0, 1, 5 and 6 which are downlink communication subframes (D) or special subframes (S) in both terminals. It can be seen that a factor of the number of PHICH groups in each subframe differs between the legacy terminal and the TDD eIMTA terminal. For example, in subframe #0, the TDD eIMTA terminal recognizes that there is no PHICH resource (factor 0), whereas the legacy terminal recognizes that there are PHICH resources corresponding to factor 2 of the number of PHICH groups.

As described above, each terminal (legacy terminal or TDD eIMTA terminal) performs blind detection of PDCCH in some resource regions except resources occupied by PCFICH, PHICH and reference signals out of resource regions corresponding to the number of OFDM symbols indicated by CFI from OFDM symbol #0. However, when the total number of PHICH groups (=number of PHICH groups×factor relating to number of PHICH groups) recognized by the terminal does not match the number of PHICH resources assumed by the base station, a blind detection range of PDCCH in the terminal may be different from the assumption made by the base station. For this reason, the terminal can neither correctly receive PHICH nor downlink control information (DCI) included in PDCCH intended for the terminal. That is, the base station cannot correctly indicate downlink control information (DCI) using PDCCH to the legacy terminal and the TDD eIMTA terminal in a single subframe. Thus, to correctly indicate DCI using PDCCH to the legacy terminal and the TDD eIMTA terminal, the base station needs to use subframes while classifying subframes into a legacy terminal subframe and a TDD eIMTA terminal subframe, which therefore causes a problem of involving large scheduling constraints regarding DCI.

FIG. 5B shows an exemplary case where Config#3 is set in a legacy terminal and Config#0 is set in a TDD eIMTA terminal. It can also be seen in FIG. 5B that both terminals have problems similar to those in FIG. 5A in subframes #0, 1, 5 and 6 which are downlink communication subframes or special subframes.

An object of the present invention is to provide a terminal apparatus, a base station apparatus, a reception method and a transmission method capable of suppressing scheduling constraints on downlink control information (DCI) for both terminals in the base station when terminals in which different UL-DL configurations are set coexist.

Solution to Problem

A terminal apparatus according to an aspect of the present invention is a terminal apparatus capable of changing setting of a configuration pattern of subframes which make up a single frame to one of a plurality of configuration patterns including a first subframe used for downlink communication and a second subframe used for uplink communication, the terminal apparatus including: a receiving section that receives a signal transmitted from a base station apparatus; and a demultiplexing section that demultiplexes the signal into a response signal assigned to a first resource identified based on a number of resources associated with the first subframe in which the signal has been received, and downlink control information assigned to a second resource, while a number of resources to which a response signal for uplink data is assigned is associated with the first subframe included in the configuration pattern, in which, when both timing of a first configuration pattern set in the terminal apparatus and timing of a second configuration pattern set in another terminal apparatus whose setting of a configuration pattern cannot be changed are the first subframes, the demultiplexing section uses a number of resources associated with the first subframe of the second configuration pattern.

A base station apparatus according to an aspect of the present invention includes: a generation section that generates a response signal for uplink data transmitted from a terminal apparatus in which one of a plurality of configuration patterns including a first subframe used for downlink communication and a second subframe used for uplink communication is set, each configuration pattern including subframes which make up one frame; an assignment section that assigns a response signal to a first resource identified based on a number of resources associated with the first subframe in which the response signal is transmitted, and downlink control information to a second resource, while a number of resources to which a response signal for uplink data is assigned is associated with the first subframe included in the configuration pattern; and a transmitting section that transmits a signal including the response signal and the downlink control information, in which, when both timing of a first configuration pattern set in the terminal apparatus and timing of a second configuration pattern set in another terminal apparatus whose setting of a configuration pattern cannot be changed are the first subframes, the assignment section uses a number of resources associated with the first subframe of the second configuration pattern for the terminal apparatus.

A reception method according to an aspect of the present invention is a method for a terminal apparatus capable of changing setting of a configuration pattern of subframes which make up a single frame to one of a plurality of configuration patterns including a first subframe used for downlink communication and a second subframe used for uplink communication, the method including: receiving a signal transmitted from a base station apparatus; and demultiplexing the signal into a response signal assigned to a first resource identified based on a number of resources associated with the first subframe in which the signal has been received, and downlink control information assigned to a second resource, while a number of resources to which a response signal for uplink data is assigned is associated with the first subframe included in the configuration pattern, in which, when both timing of a first configuration pattern set in the terminal apparatus and timing of a second configuration pattern set in another terminal apparatus whose setting of a configuration pattern cannot be changed are the first subframes, a number of resources associated with the first subframe of the second configuration pattern is used.

A transmission method according to an aspect of the present invention includes: generating a response signal for uplink data transmitted from a terminal apparatus in which one of a plurality of configuration patterns including a first subframe used for downlink communication and a second subframe used for uplink communication is set, each configuration pattern including subframes which make up one frame; assigning a response signal to a first resource identified based on a number of resources associated with the first subframe in which the response signal is transmitted, and downlink control information to a second resource, while a number of resources to which a response signal for uplink data is assigned is associated with the first subframe included in the configuration pattern; transmitting a signal including the response signal and the downlink control information; and using, when both timing of a first configuration pattern set in the terminal apparatus and timing of a second configuration pattern set in another terminal apparatus whose setting of a configuration pattern cannot be changed are the first subframes, a number of resources associated with the first subframe of the second configuration pattern for the terminal apparatus.

Advantageous Effects of Invention

According to the present invention, it is possible to suppress scheduling constraints on downlink control information (DCI) for both terminals in the base station when terminals in which different UL-DL configurations are set coexist.

BRIEF DESCRIPTION OF THE SEVERAL VIEWS OF THE DRAWINGS

FIGS. 3A and 3B illustrate factors of PHICH group number for UL-DL configuration;

FIGS. 10A and 10B are diagrams provided for describing a method of determining factors of the numbers of PHICH groups according to case 1 of the embodiment of the present invention;

FIGS. 11A and 11B are diagrams provided for describing factors of the numbers of PHICH groups according to method 1 of case 2 of the embodiment of the present invention;

FIGS. 12A and 12B are diagrams provided for describing problems associated with case 2 of the embodiment of the present invention;

FIGS. 13A and 13B are diagrams provided for describing factors of the numbers of PHICH groups according to method 2 of case 2 of the embodiment of the present invention;

FIGS. 14A and 14B are diagrams provided for describing factors of the numbers of PHICH groups according to method 3 of case 2 of the embodiment of the present invention;

DETAILED DESCRIPTION

Figure 1:
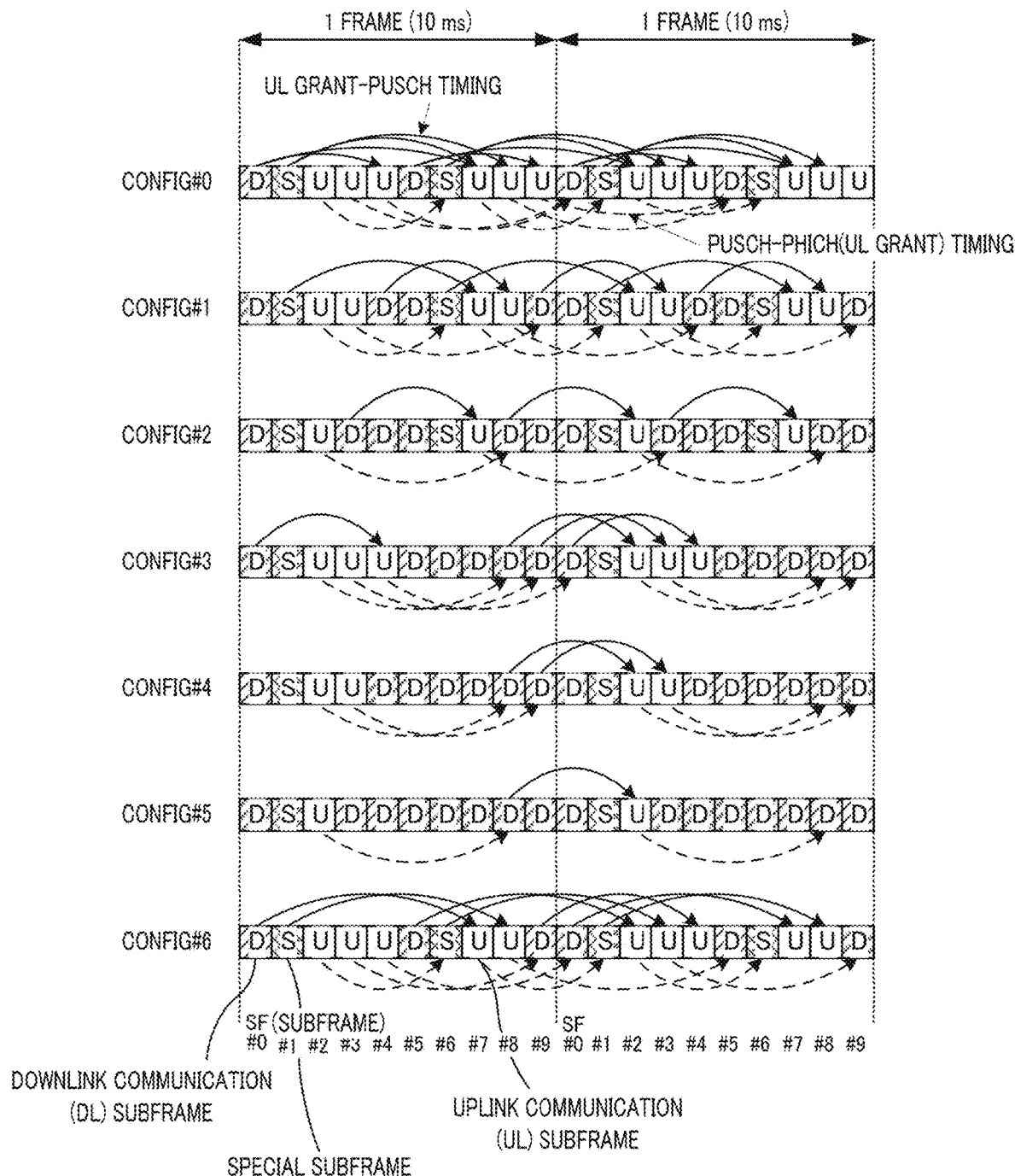
FIG. 1 is a diagram provided for describing UL-DL configuration and uplink communication retransmission control timing in TDD.
Figure 2:
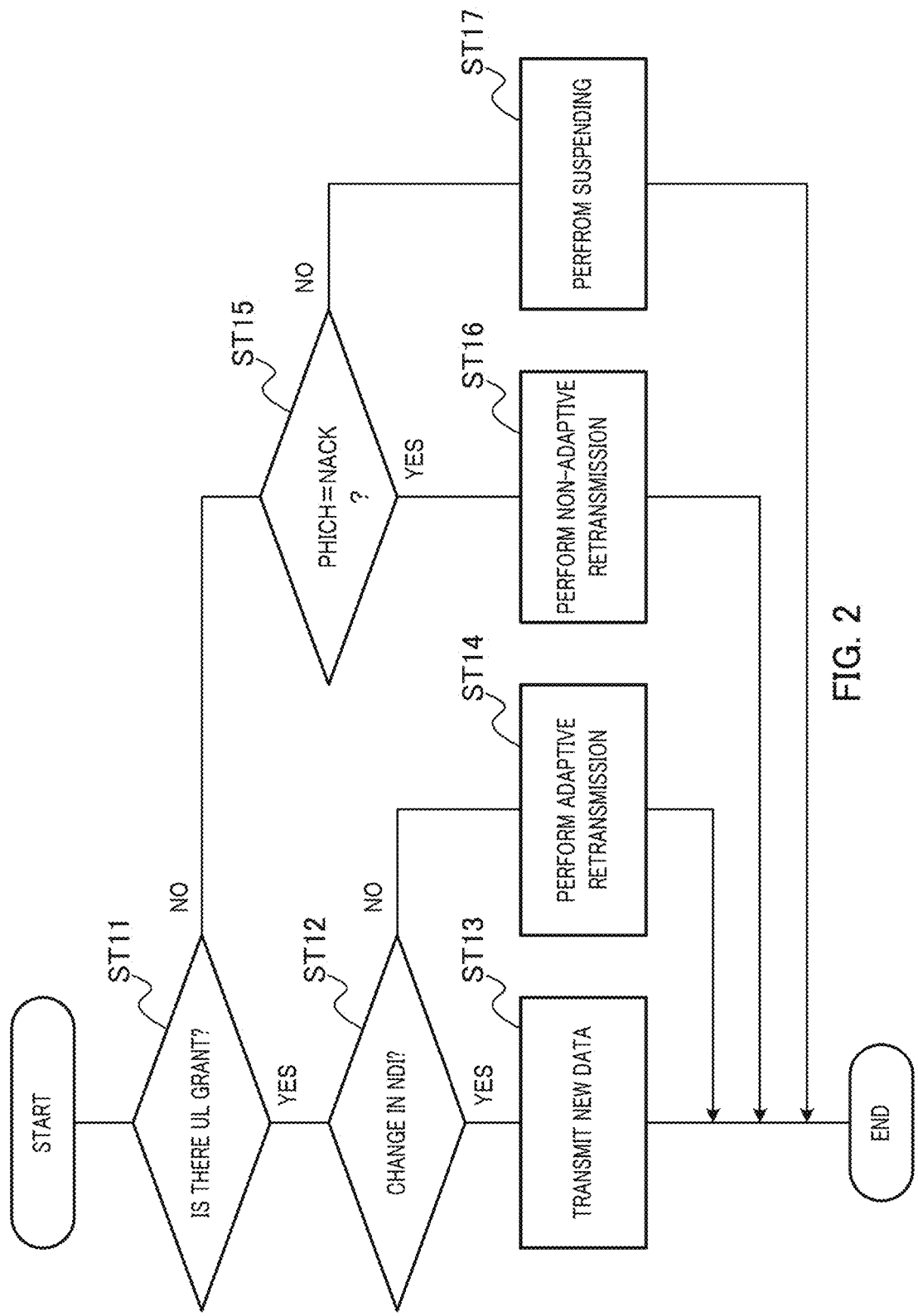
FIG. 2 is a flowchart illustrating an uplink communication retransmission control procedure.
Figure 4:
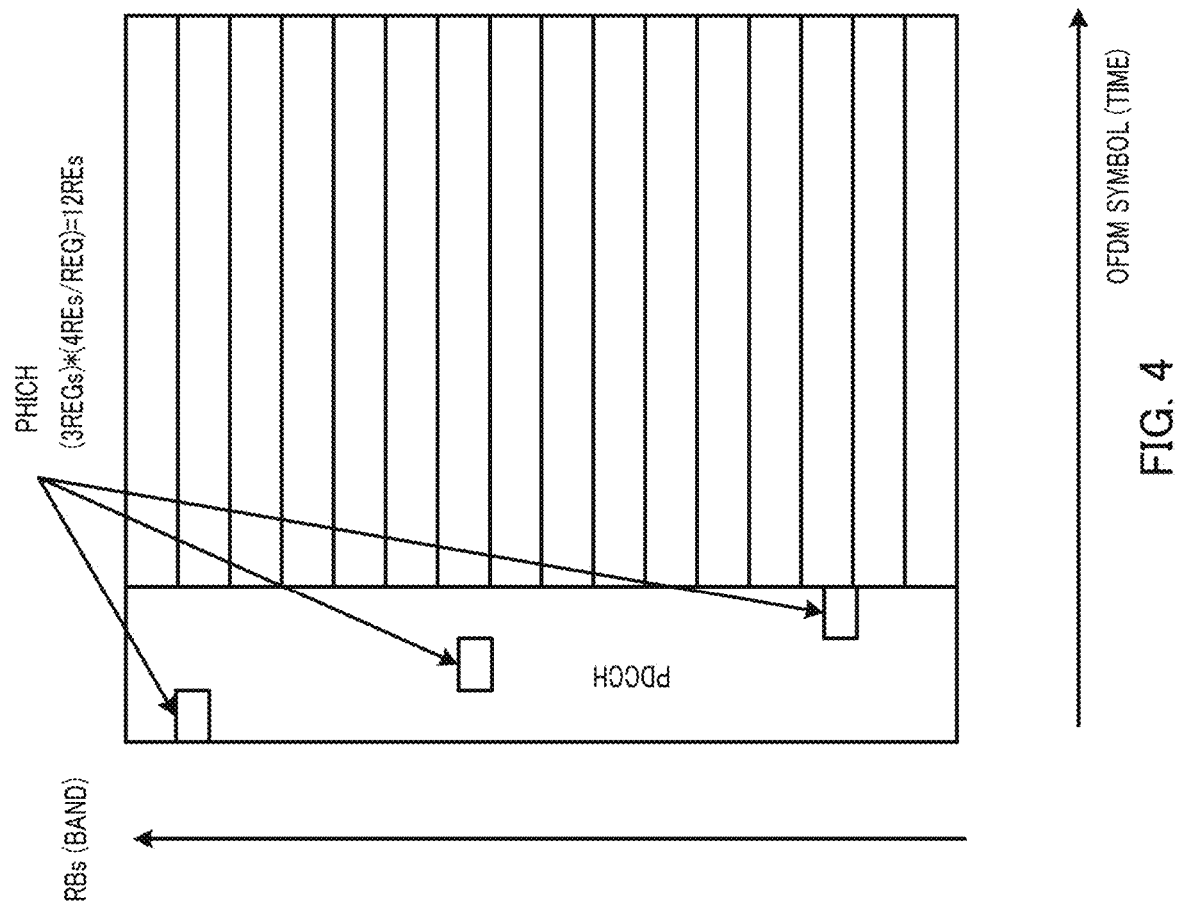
FIG. 4 illustrates an example of mapping of PHICHs.

Hereinafter, an embodiment of the present invention will be described in detail with reference to the accompanying drawings. Throughout the embodiment, the same elements are assigned the same reference numerals and any duplicate description of the elements is omitted.

Figure 6:
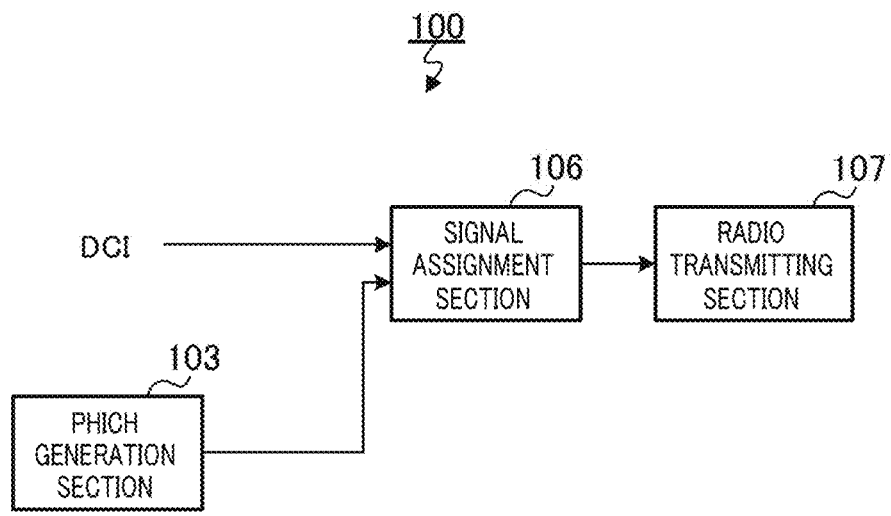
FIG. 6 is a block diagram illustrating a main configuration of a base station according to an embodiment of the present invention.

FIG. 6 is a main configuration diagram of base station 100 according to the present embodiment. In base station 100, PHICH generation section 103 generates a response signal (ACK/NACK signal) in response to uplink data transmitted from a terminal in which one of a plurality of configuration patterns (UL-DL configurations) of subframes making up one frame is set, the plurality of configuration patterns including a first subframe used for downlink communication (downlink communication subframe or special subframe) and a second subframe used for uplink communication (uplink communication subframe). Note that the number of resources (total number of PHICH groups) to which response signals are assigned is associated with the first subframe included in UL-DL configuration. Signal assignment section 106 assigns a response signal to a first resource (PHICH resource) identified based on the number of resources associated with the first subframe in which the response signal is transmitted and assigns downlink control information (DCI) to a second resource (PDCCH resource). Radio transmitting section 107 transmits the signal to which response signal and downlink control information are assigned.

Here, when both timing of a first configuration pattern set in the above terminal (TDD eIMTA terminal) and timing of a second configuration pattern set in the other terminal (non-TDD eIMTA terminal) whose UL-DL configuration setting cannot be changed are the first subframes, signal assignment section 106 uses the number of resources associated with the first subframe of the second configuration pattern for the terminal (TDD eIMTA terminal).

Figure 7:
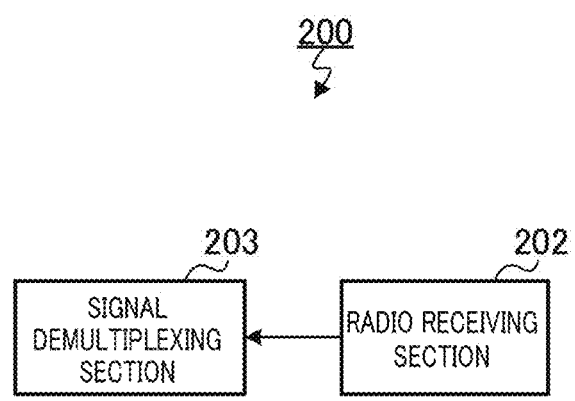
FIG. 7 is a block diagram illustrating a main configuration of a terminal according to the embodiment of the present invention.

FIG. 7 is a main configuration diagram of terminal 200 according to the present embodiment. Terminal 200 is a terminal that can change the setting of one of a plurality of configuration patterns (UL-DL configurations) of subframes making up one frame, the plurality of configuration patterns including a first subframe used for downlink communication and a second subframe used for uplink communication. Note that the number of resources (total number of PHICH groups) to which response signals in response to uplink data are assigned is associated with the first subframe included in UL-DL configuration. Radio receiving section 202 receives a signal transmitted from base station 100. Signal demultiplexing section 203 demultiplexes the signal into a response signal assigned to a first resource (PHICH resource) identified based on the number of resources associated with the first subframe in which the signal is received and downlink control information assigned to a second resource (PDCCH resource).

Here, when both timing of the first configuration pattern set in terminal 200 (TDD eIMTA terminal) and timing of the second configuration pattern set in the other terminal apparatus (non-TDD eIMTA terminal) whose UL-DL configuration setting cannot be changed are the first subframes, signal demultiplexing section 203 uses the number of resources associated with the first subframe of the second configuration pattern.

[Configuration of Base Station 100]

Figure 8:
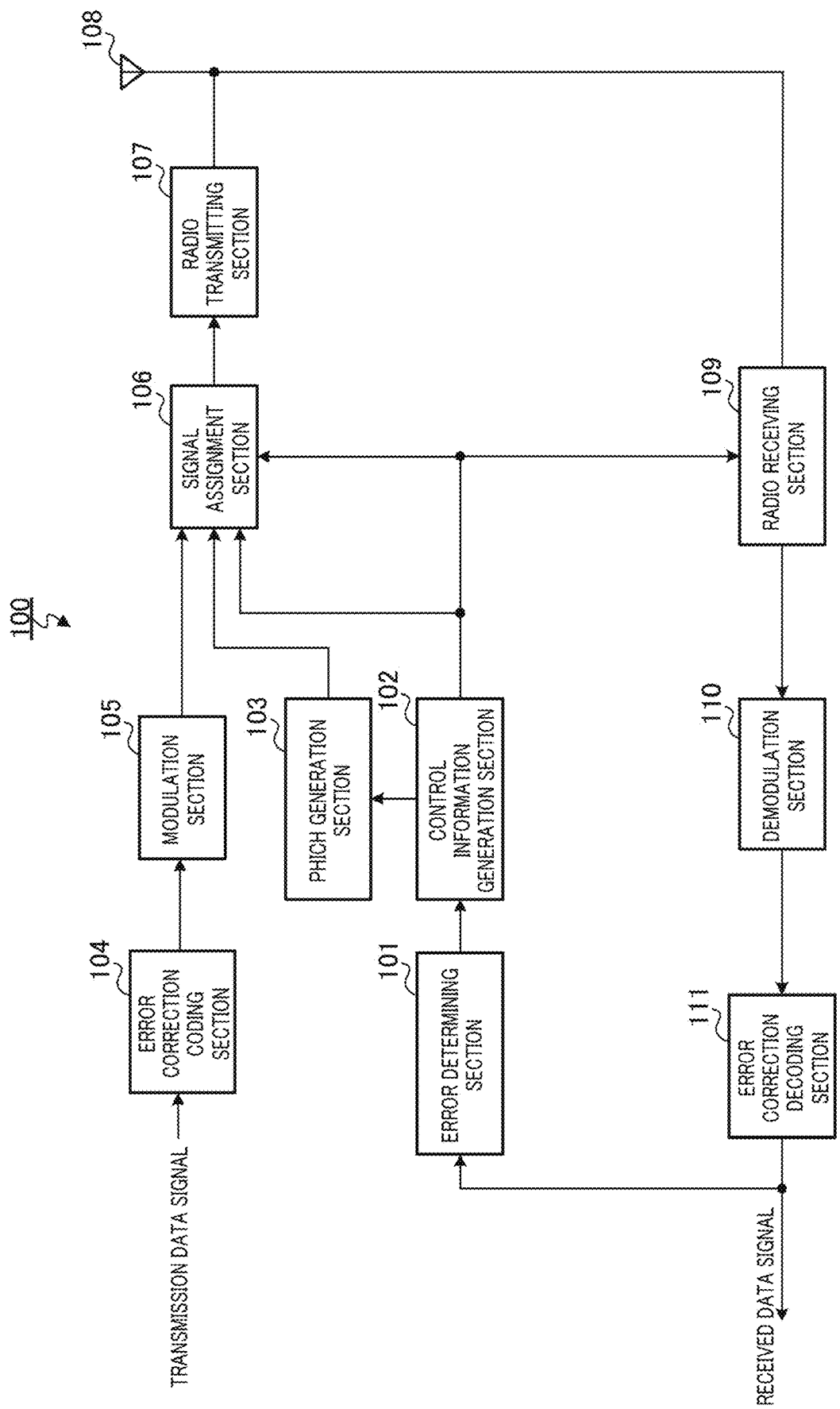
FIG. 8 is a block diagram illustrating a configuration of the base station according to the embodiment of the present invention.

FIG. 8 is a block diagram illustrating a configuration of base station 100 according to the embodiment of the present invention.

In FIG. 8, using CRC or the like, error determining section 101 determines whether or not there is any error in a data signal (uplink data) received from error correction decoding section 111 which will be described later. The determination result is outputted to control information generation section 102.

When there is a data signal to be transmitted over the downlink, control information generation section 102 determines a resource to which the data signal is assigned and generates DL assignment which is assignment information. When there is a data signal to be assigned to the uplink, control information generation section 102 determines a resource to which the data signal is assigned and generates UL grant which is assignment information. Note that control information generation section 102 determines whether or not to cause the terminal to retransmit the signal (that is, uplink data), based on the determination result received from error determining section 101. The generated assignment information is outputted to signal assignment section 106 as information to be transmitted via PDCCH (or EPDCCH). The DL assignment is also outputted to signal assignment section 106 as control information for transmitting downlink data. The UL grant is outputted to radio receiving section 109 to receive uplink data.

If a signal need not be retransmitted to the terminal on the basis of the determination result received from error determining section 101 or a signal is adaptively retransmitted, control information generation section 102 instructs PHICH generation section 103 to generate an ACK. Meanwhile, if a signal is non-adaptively retransmitted to the terminal, control information generation section 102 instructs PHICH generation section 103 to generate a NACK.

PHICH generation section 103 generates an ACK/NACK signal (ACK or NACK) according to an instruction from control information generation section 102.

Error correction coding section 104 performs error correction coding on a transmission data signal (that is, a downlink data signal) and outputs the coded signal to modulation section 105.

Modulation section 105 modulates the signal received from error correction coding section 104 and outputs the modulated signal to signal assignment section 106.

Signal assignment section 106 assigns the modulated signal received from modulation section 105 to a corresponding resource based on the DL assignment received from control information generation section 102. In addition, signal assignment section 106 assigns DCI including the DL assignment and UL grant received from control information generation section 102 to a PDCCH resource region of (PDCCH region) (or an EPDCCH resource region (EPDCCH region)). Furthermore, when an ACK/NACK signal is outputted from PHICH generation section 103, signal assignment section 106 assigns the ACK/NACK signal to the PHICH resource region. More specifically, signal assignment section 106 assigns an ACK/NACK signal to a PHICH resource identified based on a factor of the number of PHICH groups (that is, total number of PHICH groups associated with the subframe) defined for a subframe in which the ACK/NACK signal is transmitted (downlink communication subframe or special subframe) and assigns DCI to a PDCCH resource other than at least a PHICH resource in a predetermined resource region (region determined by the abovementioned CFI). One of a plurality of UL-DL configurations (e.g., Config#0 to #6) is set in the terminal that has transmitted uplink data corresponding to the above ACK/NACK signal. Details of the assignment operation by signal assignment section 106 will be described later.

In this way, a transmission data signal, control information (assignment information (DL assignment, UL grant) or the like) and PHICH signal (ACK/NACK signal) are assigned to predetermined resources and a transmission signal is thereby generated. The generated transmission signal is outputted to radio transmitting section 107.

Radio transmitting section 107 applies predetermined radio transmission processing such as up-conversion to the transmission signal received from signal assignment section 106 and transmits the transmission signal via antenna 108.

Radio receiving section 109 receives a signal transmitted from the terminal via antenna 108 and applies predetermined radio reception processing such as down-conversion to the received signal. Radio receiving section 109 then demultiplexes the signal transmitted from the terminal using the UL grant received from control information generation section 102 and outputs the signal to demodulation section 110.

Demodulation section 110 applies demodulation processing to the signal received from radio receiving section 109 and outputs the demodulated signal thus obtained to error correction decoding section 111.

Error correction decoding section 111 decodes the demodulated signal received from demodulation section 110 and obtains a received data signal. The received data signal obtained is also outputted to error determining section 101.

[Configuration of Terminal 200]

Figure 9:
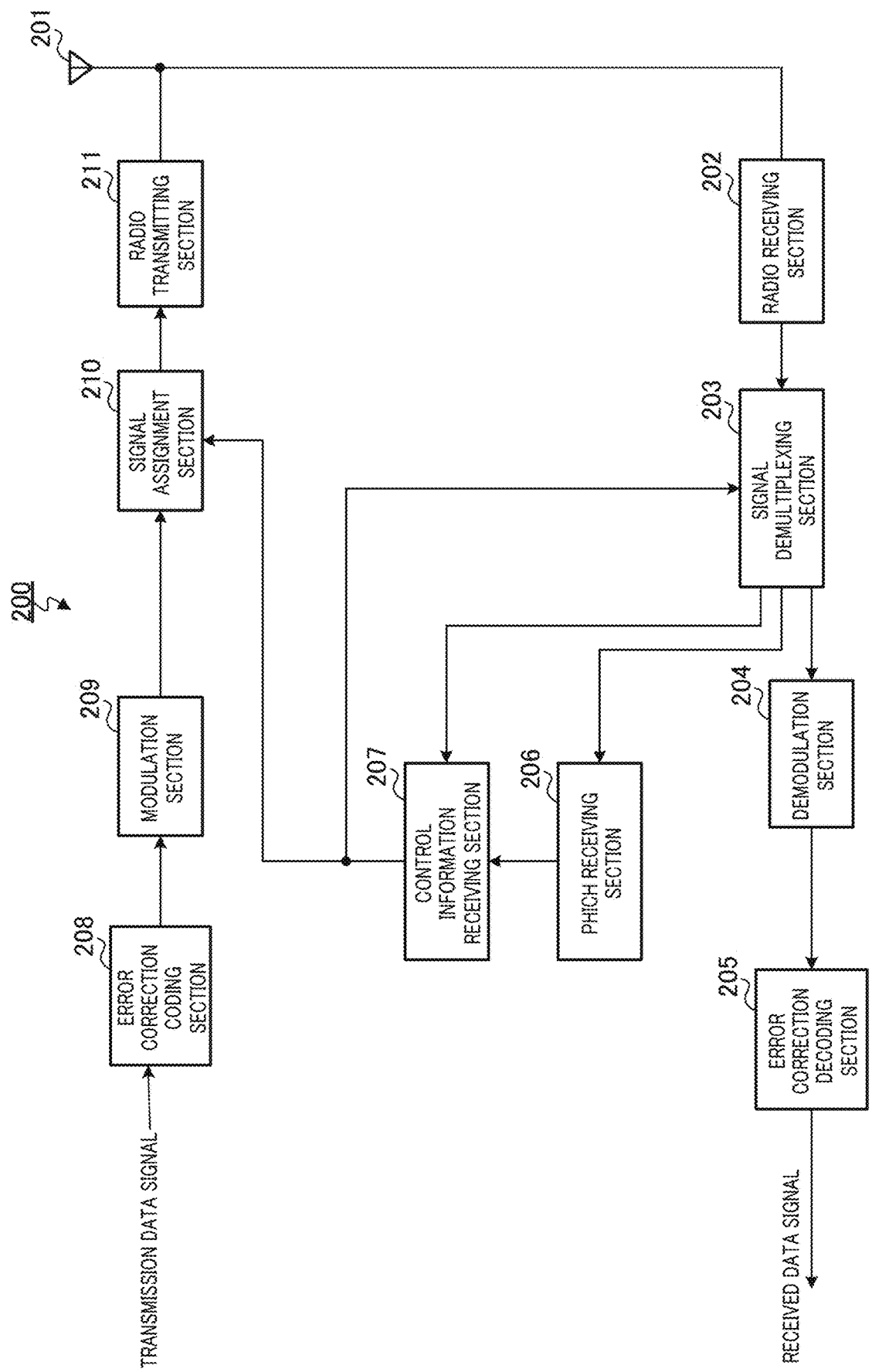
FIG. 9 is a block diagram illustrating a configuration of the terminal according to the embodiment of the present invention.

FIG. 9 is a block diagram illustrating a configuration of terminal 200 according to the present embodiment.

In FIG. 9, radio receiving section 202 receives a signal transmitted from base station 100 via antenna 201, applies predetermined radio reception processing such as down-conversion and outputs the signal subjected to the radio reception processing to signal demultiplexing section 203.

Signal demultiplexing section 203 extracts a PHICH region signal (ACK/NACK signal) and a PDCCH region signal (control information) from the signal received from radio receiving section 202 and outputs the extracted PHICH region signal and PDCCH region signal to PHICH receiving section 206 and control information receiving section 207, respectively. More specifically, signal demultiplexing section 203 demultiplexes the received signal into control information (DCI) assigned to a PDCCH resource other than at least a PHICH resource of ACK/NACK signal assigned to the PHICH resource (number of resources and resource position) identified based on a factor of the number of PHICH groups defined in a subframe in which radio receiving section 202 receives the received signal (downlink communication subframe or special subframe) (that is, total number of PHICH groups associated with the subframe) and predetermined resource region (region determined by the aforementioned CFI). Details of the demultiplexing operation by signal demultiplexing section 203 will be described later.

Signal demultiplexing section 203 extracts a signal assigned to a data resource indicated by the DL assignment received from control information receiving section 207 which will be described later (that is, downlink data signal) from the received signal and outputs the extracted signal to demodulation section 204.

Demodulation section 204 demodulates the signal received from signal demultiplexing section 203 and outputs the demodulated signal to error correction decoding section 205.

Error correction decoding section 205 decodes the demodulated signal received from demodulation section 204 and outputs the received data signal obtained.

PHICH receiving section 206 determines whether the PHICH region signal extracted by signal demultiplexing section 203 is ACK or NACK. The determination result is outputted to control information receiving section 207.

Control information receiving section 207 performs blind decoding on the PDCCH region signal extracted by signal demultiplexing section 203 and thereby extracts control information (e.g., DL assignment or UL grant) intended for terminal 200. Control information receiving section 207 outputs the extracted DL assignment to signal demultiplexing section 203 and outputs the UL grant to signal assignment section 210.

Control information receiving section 207 also functions as a retransmission control section. When the determination result received from PHICH receiving section 206 is NACK and no UL grant is detected, control information receiving section 207 outputs a signal indicating non-adaptive retransmission (retransmission indication signal) to signal assignment section 210. Meanwhile, when the determination result received from PHICH receiving section 206 is an ACK and no UL grant is detected, control information receiving section 207 does not output any signal indicating the assignment to signal assignment section 210.

Error correction coding section 208 performs error correction coding on a transmission data signal (that is, uplink data) and outputs the coded signal to modulation section 209.

Modulation section 209 modulates the signal outputted from error correction coding section 208 and outputs the modulated signal to signal assignment section 210.

Upon receiving UL grant from control information receiving section 207, signal assignment section 210 compares an NDI of the UL grant (NDI of the UL grant this time) with the NDI of the last UL grant in the same retransmission process, determines, when there is any change in the NDI, that new data has been assigned and assigns a modulated signal of the new data outputted from modulation section 209 to data resources according to the UL grant. Meanwhile, when there is no change in the NDI, signal assignment section 210 determines that retransmission data has been assigned and assigns the modulated signal of the retransmission data outputted from modulation section 209 to data resources according to the UL grant. Upon receiving a retransmission indication signal from control information receiving section 207, signal assignment section 210 assigns the modulated signal of the retransmission data outputted from modulation section 209 to data resources according to the last UL grant in the same retransmission process. The assigned signal is outputted to radio transmitting section 211 as a transmission signal.

Radio transmitting section 211 applies predetermined radio transmission processing such as up-conversion to the transmission signal received from signal assignment section 210 and transmits the transmission signal via antenna 201.

[Operations of Base Station 100 and Terminal 200]

Operations of base station 100 and terminal 200 having the above-described configurations will be described in detail. Here, a TDD eIMTA terminal (terminal 200) whose UL-DL configuration setting can be changed and a non-TDD eIMTA terminal (including a legacy terminal) whose UL-DL configuration setting cannot be changed coexist within the same cell covered by base station 100. A case where the UL-DL configuration of terminal 200, which is a TDD eIMTA terminal, is a downlink communication subframe or special subframe will be described separately using two cases.

<Case 1>:

Where UL-DL configuration of the non-TDD eIMTA terminal is a downlink communication subframe or special subframe, and <Case 2>:

where UL-DL configuration of the non-TDD eIMTA terminal is an uplink communication subframe.

<Case 1>

A method of determining the number of PHICH resources by base station 100, and a method of determining the total number of PHICH groups and a method of detecting the PDCCH by terminal 200 (TDD eIMTA terminal) will be described using FIG. 10.

Figures 5A, 5B:
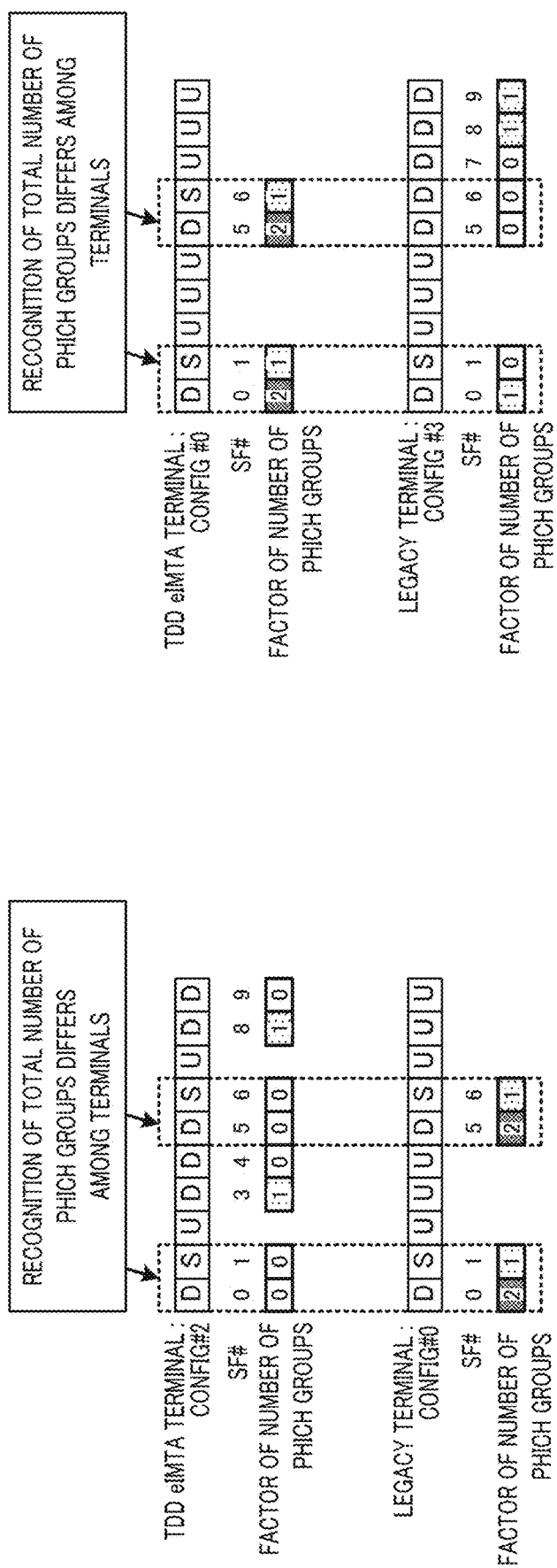
FIGS. 5A and 5B are diagrams provided for describing problems with respect to different UL-DL configurations.
Figures 10A, 10B:
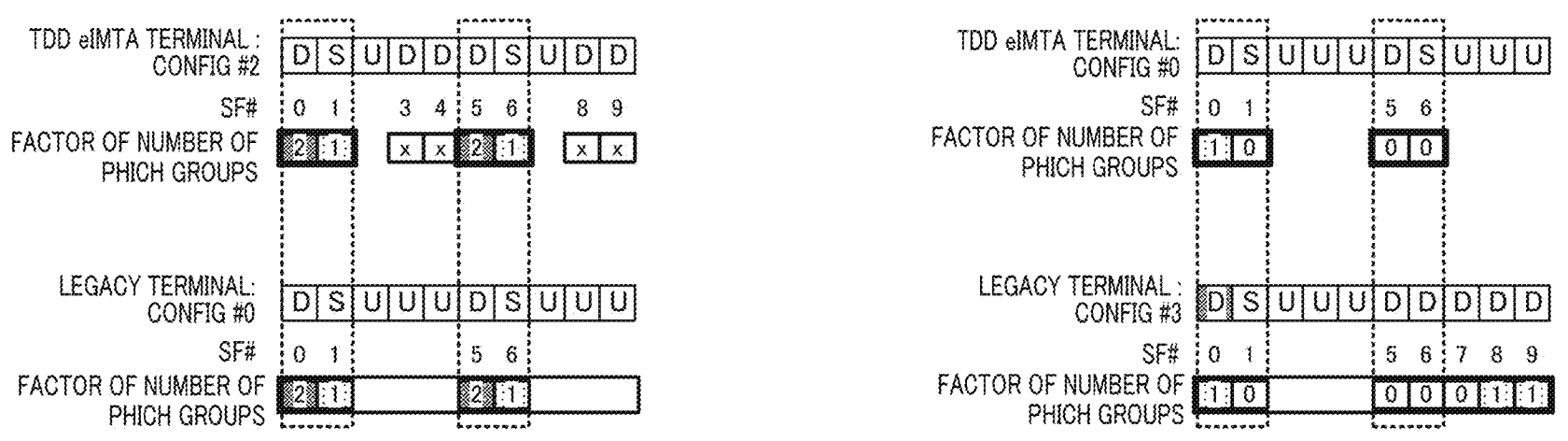

The UL-DL configurations of terminals in FIG. 10A and FIG. 10B correspond to the UL-DL configurations of terminals in FIG. 5A and FIG. 5B, respectively. In FIG. 10A, although a factor of the number of PHICH groups in subframe #3, 4, 8 and 9 of the TDD eIMTA terminal is represented by "x," the value of "x" may be determined using one of the methods in <Case 2> which will be described later.

Here, the TDD eIMTA terminal (terminal 200) is first connected to a cell that supports TDD eIMTA using UL-DL configuration which is SIB1-indicated as UL-DL configuration for connection to a cell. The TDD eIMTA terminal may be changed to a different UL-DL configuration based on an instruction of base station 100 in the cell after the cell connection. That is, the TDD eIMTA terminal can receive not only a UL-DL configuration for TDD eIMTA (that is, UL-DL configuration which is set in the TDD eIMTA terminal yet different from SIB1-indicated UL-DL configuration) but also an SIB1-indicated UL-DL configuration (that is, UL-DL configuration set in the non-TDD eIMTA terminal). In contrast, a non-TDD eIMTA terminal including a legacy terminal can receive an SIB1-indicated UL-DL configuration, but need not receive a UL-DL configuration for TDD eIMTA or cannot receive any UL-DL configuration in the first place.

Thus, at timing of case 1, base station 100 secures the number of PHICH resources and the PHICH resource position according to the factor of the number of PHICH groups based on the SIB1-indicated UL-DL configuration irrespective of the current UL-DL configuration of terminal 200 for the TDD eIMTA terminal (terminal 200). Base station 100 sets a PDCCH region based on the secured PHICH region.

Meanwhile, at timing of case 1, terminal 200 detects PDCCH assuming that the number of PHICH resources and the PHICH resource position are secured according to the factor of the number of PHICH groups based on the SIB1-indicated UL-DL configuration irrespective of the current UL-DL configuration of terminal 200.

That is, at timing of case 1 at which both the UL-DL configuration set in the TDD eIMTA terminal and the UL-DL configuration set in the non-TDD eIMTA terminal are downlink communication subframes or special subframes, base station 100 (e.g., signal assignment section 106) and terminal 200 (e.g., signal demultiplexing section 203), in order to eliminate a difference in recognition of the total number of PHICH groups between the TDD eIMTA terminal and the non-TDD eIMTA terminal, identify resource regions of PHICH and PDCCH using the factor of number of PHICH groups defined in the UL-DL configuration (SIB1-indicated UL-DL configuration) set in the non-TDD eIMTA terminal for the TDD eIMTA terminal. In other words, at timing of case 1, base station 100 and terminal 200 use the total number of PHICH groups (number of PHICH resources) associated with the timing of the UL-DL configuration set in the non-TDD eIMTA terminal.

More specifically, in subframes #0, 1, 5 and 6 corresponding to case 1 in FIG. 10A, base station 100 (signal assignment section 106) sets the factor ($m_i$) of number of PHICH groups for the TDD eIMTA terminal (terminal 200) to the same number (($m_i$=2, 1, 2, 1) in that order) as the factor ($m_i$) of the number of PHICH groups set in the legacy terminal (non-TDD eIMTA terminal). Thus, in subframes #0, 1, 5 and 6 shown in FIG. 10A, base station 100 sets the same total number of PHICH groups (=number of PHICH groups× factor of number of PHICH groups) for the TDD eIMTA terminal and the non-TDD eIMTA terminal. Thus, in subframes #0, 1, 5 and 6 shown in FIG. 10A, base station 100 sets the same PDCCH region for the TDD eIMTA terminal and the non-TDD eIMTA terminal. Thus, the PDCCH blind detection range is the same for the TDD eIMTA terminal and the non-TDD eIMTA terminal.

Meanwhile, terminal 200 (signal demultiplexing section 203) assumes the factor of number of PHICH groups in subframes #0, 1, 5 and 6 shown in FIG. 10A to be the same number as the factor of the number of PHICH groups recognized by the legacy terminal (factor defined in the SIB1-notified UL-DL configuration) (2, 1, 2, 1 in that order), not the factor of the number of PHICH groups corresponding to Config#2 set in terminal 200. Thus, in subframes #0, 1, 5 and 6 shown in FIG. 10A, terminal 200 detects PDCCH intended for terminal 200 in the same PDCCH region (blind detection range) as that of the legacy terminal.

Similarly, in subframes #0, 1, 5 and 6 shown in FIG. 10B, base station 100 and terminal 200 set the factor of PHICH group number of terminal 200 to the same number (1, 0, 0, 0 in that order) as the factor of the number of PHICH groups recognized by the legacy terminal and perform assignment processing and demultiplexing processing (and detection processing) in PHICH and PDCCH, respectively.

Effects

In this way, at timing of case 1, the difference in recognition of the total number of PHICH groups between the TDD eIMTA terminal and non-TDD eIMTA terminal is eliminated and the numbers of PHICH resources assumed by each terminal and base station 100 match. Thus, in the same subframe, base station 100 can correctly indicate DCI using PDCCH to the TDD eIMTA terminal and the non-TDD eIMTA terminal. Moreover, the TDD eIMTA terminal (terminal 200) and non-TDD eIMTA terminal can detect PDCCH intended for terminal 200 in the same subframe. In this way, base station 100 need not divide a subframe to be used in the TDD eIMTA terminal and non-TDD eIMTA terminal, and so there is no scheduling constraint regarding DCI.

[PDCCH Detection Method and PHICH Detection Method]

Next, in case 1, the operations of terminal 200 relating to PDCCH detection and PHICH detection will be described in detail in each of combinations (a) to (d) of the factor of the number of PHICH groups corresponding to UL-DL configuration for TDD eIMTA set in terminal 200 (TDD eIMTA terminal) and the factor of the number of PHICH groups corresponding to the UL-DL configuration SIB1-indicated to the legacy terminal (non-TDD eIMTA terminal).

In any combinations (a) to (d) which will be described later, terminal 200 performs blind detection of PDCCH in some resource regions except PCFICH resources, reference signal resources and PHICH resources secured using a method which will be described later out of resource regions (predetermined resource regions) corresponding to the number of OFDM symbols indicated by CFI from OFDM symbol #0.

(a) When the factor of number of PHICH groups corresponding to UL-DL configuration for TDD eIMTA is 0 and the SIB1-indicated factor of the number of PHICH groups is 1 or 2

In the subframes, terminal 200 secures, for PHICH, PHICH resources (number of PHICH resources and corresponding PHICH resource positions) identified based on the factor of the number of PHICH groups (1 or 2) defined in the SIB1-indicated UL-DL configuration for PDCCH detection. However, since there is no PHICH intended for terminal 200, terminal 200 need not perform PHICH detection.

(b) When the factor of the number of PHICH groups corresponding to UL-DL configuration for TDD eIMTA is 1 and the SIB1-indicated factor of the number of PHICH groups is 2

In the subframes, terminal 200 secures, for PHICH, PHICH resources (number of PHICH resources and corresponding PHICH resource positions) identified based on factor 2 of the number of PHICH groups defined in the SIB1-indicated UL-DL configuration for PDCCH detection. Furthermore, terminal 200 performs PHICH detection. Therefore, both adaptive retransmission and non-adaptive retransmission are available as the uplink data retransmission method for terminal 200.

(c) When the factor of the number of PHICH groups corresponding to UL-DL configuration for TDD eIMTA is 1 or 2 and the SIB1-indicated factor of PHICH group number is 0

In the subframes, terminal 200 does not secure any PHICH resource for PDCCH detection. Terminal 200 does not perform PHICH detection either. Therefore, only adaptive retransmission is available as the uplink data retransmission method for terminal 200.

(d) When the factor of the number of PHICH groups corresponding to UL-DL configuration for TDD eIMTA is 2 and the SIB1-indicated factor of the number of PHICH groups is 1

In the subframes, terminal 200 secures, for PHICH, PHICH resources (number of PHICH resources and corresponding PHICH resource positions) identified based on factor 1 of the number of PHICH groups defined in the SIB1-indicated UL-DL configuration for PDCCH detection. Moreover, terminal 200 performs PHICH detection only for one piece of uplink data (assumed to be first uplink data) of two pieces of uplink data corresponding to PHICH received in the subframes and does not perform PHICH detection on the other uplink data (assumed to be second uplink data). Therefore, as the uplink data retransmission method for terminal 200, both adaptive retransmission and non-adaptive retransmission are available for the first uplink data and only adaptive retransmission is available for the second uplink data.

Alternatively, terminal 200 secures, for PHICH corresponding to the first uplink data, PHICH resources (number of PHICH resources and corresponding PHICH resource positions) identified based on factor 1 of the number of PHICH groups defined in the SIB1-indicated UL-DL configuration for PDCCH detection. Furthermore, terminal 200 determines a PHICH resource corresponding to the second uplink data based on the PHICH resource corresponding to the first uplink data. More specifically, when a PHICH resource for the first uplink data is determined by a parameter set ($I_{PRB\_RA}$, $n_{DMRS}$), terminal 200 determines a PHICH resource corresponding to the second uplink data using a parameter set ($I_{PRB\_RA}+1$, $n_{DMRS}$). In this case, both non-adaptive retransmission and adaptive retransmission are available for both the first uplink data and the second uplink data. Here, $I_{PRB\_RA}$ represents a leading PRB of uplink data assignment. For this reason, there is a high possibility that $I_{PRB\_RA}+1$ representing PRB neighboring the PRB corresponding to $I_{PRB\_RA}$ may also be occupied by the uplink data. That is, the possibility that base station 100 may assign uplink data whose leading PRB is the PRB corresponding to $I_{PRB\_RA}+1$ to other terminals except terminal 200 is low. Therefore, even when base station 100 uses a PHICH resource corresponding to $I_{PRB\_RA}+1$ in addition to a PHICH resource corresponding to $I_{PRB\_RA}$ for terminal 200, it is possible to reduce the possibility of producing constraints on scheduling for other terminals.

The operations relating to PDCCH detection and PHICH detection by terminal 200 in each combination (a to d) have been described. As in the case of the operation of aforementioned terminal 200, base station 100 performs PDCCH and PHICH resource assignment and retransmission control for terminal 200.

<Case 2>

The method of determining the number of PHICH resources in base station 100, the method of determining the total number of PHICH groups in terminal 200 (TDD eIMTA terminal) and the PDCCH detection method will be described with reference to FIG. 11 to FIG. 17.

In case 2, since the UL-DL configuration of the non-TDD eIMTA terminal is an uplink communication subframe, the TDD eIMTA terminal need not follow the factor used by the non-TDD eIMTA terminal and defined in the SIB1-indicated UL-DL configuration, that is, the total number of PHICH groups. Focusing on this aspect, methods 1 to 4 of setting the total number of PHICH groups (factor of the number of PHICH groups) for the TDD eIMTA terminal will be described hereinafter.

(Method 1)

In method 1, the total number of PHICH groups is determined based on UL-DL configuration for TDD eIMTA. That is, at the timings corresponding to case 2, base station 100 and terminal 200 use the factor of the number of PHICH groups defined for the timing of UL-DL configuration set in terminal 200. In other words, at the timings corresponding to case 2, base station 100 and terminal 200 use the total number of PHICH groups associated with the timing of UL-DL configuration set in terminal 200.

Figures 11A, 11B:
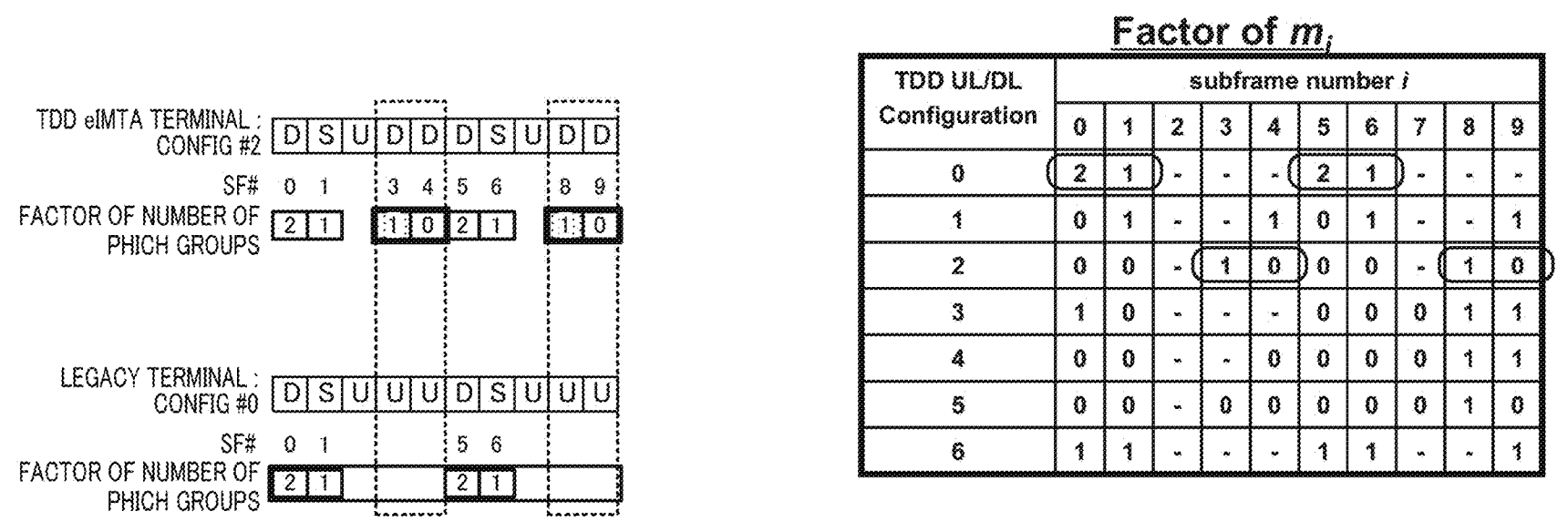

Method 1 will be described using FIG. 11. Note that UL-DL configuration of each terminal in FIG. 11A corresponds to the UL-DL configuration of each terminal in FIG. 10A. In FIG. 11A, the timings corresponding to case 2 (when timing at the TDD eIMTA terminal is a downlink communication subframe or special subframe, and timing at the non-TDD eIMTA terminal is an uplink communication subframe) are subframes #3, 4, 8 and 9.

At the timings corresponding to case 2, when base station 100 performs downlink communication, base station 100 secures PHICH resources (number of PHICH resources and PHICH resource positions) based on the factor of the number of PHICH groups defined in the current UL-DL configuration of terminal 200 (Config#2 in FIG. 11A) for terminal 200 (TDD eIMTA terminal). That is, as shown in FIG. 11B, in subframes #3, 4, 8 and 9, base station 100 secures PHICH resources identified based on a factor ($m_i$) of PHICH groups of 1, 0, 1 and 0, respectively for terminal 200. Furthermore, base station 100 sets PDCCH resources based on the secured PHICH resources.

Meanwhile, at the timings corresponding to case 2, terminal 200 determines the factor of the number of PHICH groups based on the factor of the number of PHICH groups defined in UL-DL configuration for TDD eIMTA (Config#2 in FIG. 11A) currently set in terminal 200. That is, as shown in FIG. 11B, in subframes #3, 4, 8 and 9, terminal 200 detects PHICH and PDCCH assuming that PHICH resources (number of PHICH resources and corresponding PHICH resource positions) identified based on the factor ($m_i$) of PHICH groups of 1, 0, 1 and 0 have been secured.

Effects

In this way, base station 100 can apply non-adaptive retransmission using an optimum total number of PHICH groups for terminal 200 using UL-DL configuration for TDD eIMTA, that is, by securing just enough PHICH resources.

[PDCCH Detection Method and PHICH Detection Method]

Next, operations relating to PDCCH detection and PHICH detection by terminal 200 will be described in detail.

(a) When factor of the number of PHICH groups corresponding to UL-DL configuration for TDD eIMTA is 0.

In the subframes, terminal 200 does not secure any PHICH resources for PDCCH detection. In addition, terminal 200 need not perform PHICH detection because there is no PHICH intended for terminal 200.

(b) When factor of the number of PHICH groups corresponding to UL-DL configuration for TDD eIMTA is 1 or 2

In the subframes, for PDCCH detection, terminal 200 secures PHICH resources (number of PHICH resources and corresponding PHICH resource position) identified based on the factor of the number of PHICH groups (1 or 2) defined in UL-DL configuration for TDD eIMTA for PHICH. Furthermore, terminal 200 performs PHICH detection. Therefore, both adaptive retransmission and non-adaptive retransmission are available as the uplink data retransmission method for terminal 200.

(Method 2)

In method 2, the total number of PHICH groups is determined based on a maximum value for each subframe in all UL-DL configurations (e.g., Config#0 to Config#6). That is, at the timings corresponding to case 2, base station 100 and terminal 200 use a maximum value in factors of the numbers of PHICH groups defined for the timings of a plurality of UL-DL configurations. In other words, at timings corresponding to case 2, base station 100 and terminal 200 use a maximum value among the total numbers of PHICH groups associated with the plurality of UL-DL configurations, respectively.

Before describing method 2, premises and problems will be described using FIG. 12.

Method 2 assumes a case where there are two TDD eIMTA terminals in addition to the non-TDD eIMTA terminal (legacy terminal) using SIB1-indicated UL-DL configuration. Method 2 also assumes that mutually different UL-DL configurations which are also different from SIB1-indicated UL-DL configuration are set in two TDD eIMTA terminals.

Figures 12A, 12B:
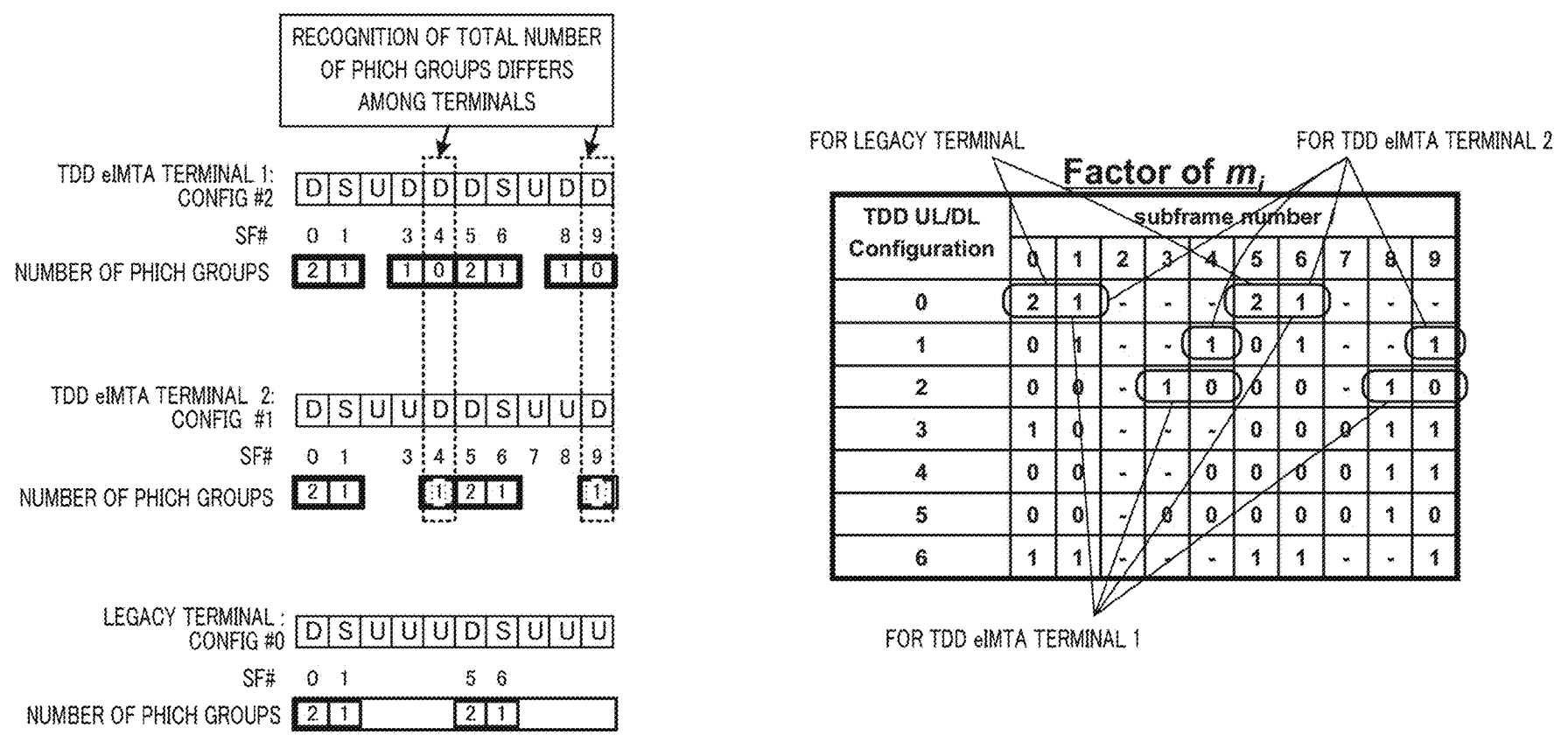

For example, in FIG. 12A, TDD eIMTA terminal 1 in which Config#2 is set and TDD eIMTA terminal 2 in which Config#1 is set exist in addition to the legacy terminal in which Config#0 is set. In FIG. 12, when timings of the TDD eIMTA terminal are downlink communication subframes or special subframes and timings of the non-TDD eIMTA terminal (legacy terminal) are uplink communication subframes (subframes #3, 4, 8 and 9), the factor of the number of PHICH groups is set based on method 1 for each TDD eIMTA terminal. That is, in TDD eIMTA terminal 1, the factors of the numbers of PHICH groups in subframes #3, 4, 8 and 9 are 1, 0, 1 and 0 as shown in FIG. 12B. In TDD eIMTA terminal 2, the factors of the numbers of PHICH groups in subframes #4 and 9 are 1 and 1 as shown in FIG. 12B.

Here, in TDD eIMTA terminal 1 and TDD eIMTA terminal 2, attention is focused on the factors of the number of PHICH groups in subframes #4 and 9 in which timings of both terminals are downlink communication subframes or special subframes. It is seen that the factor of the number of PHICH groups in each subframe differs between TDD eIMTA terminal 1 and TDD eIMTA terminal 2. Thus, as described in FIGS. 5A and 5B, since base station 100 cannot simultaneously perform scheduling for both TDD eIMTA terminal 1 and TDD eIMTA terminal 2 in subframes #4 and 9, there are constraints on scheduling regarding DCI.

As shown in FIG. 12A, in addition to the non-TDD eIMTA terminal (legacy terminal) using SIB1-indicated UL-DL configuration, there are two TDD eIMTA terminals and mutually different UL-DL configurations which are also different from SIB1-indicated UL-DL configuration are set for the two TDD eIMTA terminals, in which case following two cases I and II are considered.

Case I: System assumed to be operated using three or more different UL-DL configurations within one cell.

Case II: When UL-DL configuration settings are simultaneously changed for a plurality of TDD eIMTA terminals, the terminal cannot receive an instruction for changing the UL-DL configuration setting due to a reception failure in some of the plurality of TDD eIMTA terminals.

As described above, the TDD eIMTA terminal can receive SIB1-indicated UL-DL configuration in addition to UL-DL configuration for TDD eIMTA intended for terminal 200. Meanwhile, it is assumed that each TDD eIMTA terminal cannot receive UL-DL configuration for TDD eIMTA intended for other TDD eIMTA terminals.

Thus, in method 2, as shown in FIG. 13A, when the timings of the non-TDD eIMTA terminal (legacy terminal) are uplink communication subframes and timing of at least one of all UL-DL configurations other than SIB1-notified UL-DL configuration is a downlink communication subframe or special subframe (subframes #3, 4, 7, 8 and 9 in FIG. 13A), when base station 100 performs downlink communication (subframes #3, 4, 8 and 9 in FIG. 13A), base station 100 secures, for these TDD eIMTA terminals, PHICH resources (number of PHICH resources and PHICH resource positions) assuming a maximum value of factors of the number of PHICH groups defined in all UL-DL configurations (Config#0 to 6) in the subframes as the factor of the number of PHICH groups in the subframes. Meanwhile, when timings of SIB1-indicated UL-DL configuration are uplink communication subframes and timings of the UL-DL configuration set in the terminal are downlink communication subframes or special subframes, terminal 200 (TDD eIMTA terminal) identifies the number of PHICH resources and a corresponding PHICH resource position assuming a maximum value of the factors of the number of PHICH groups defined in all UL-DL configurations (Config#0 to 6) in the subframes as the factor of the number of PHICH groups in the subframes and detects PDCCH.

For example, according to FIG. 13B, since the factor of the number of PHICH groups in subframe #3 is 1 in Config#2 and 0 in Config#5, the maximum value is 1. Similarly, since the factor of the number of PHICH groups in subframe #8 is always 1 in Config#2 to 5, the maximum value is 1. Since the factor of the number of PHICH groups in subframe #7 is always 0 in Config#3 to 5, the maximum value is 0. The same applies to other subframes #4 and 9.

Note that method 2 is applicable to above two cases I and II.

Effects

This allows base station 100 to eliminate the difference in recognition of the total number of PHICH groups among a plurality of TDD eIMTAs and determine PHICH resources, thereby making it possible to perform PDCCH scheduling for the plurality of TDD eIMTA terminals, and at the same time allowing each TDD eIMTA terminal to detect PDCCH in the same subframe. It is also possible to secure just enough PHICH resources for all TDD eIMTA terminals.

In the above description, the "maximum value of the factor of the number of PHICH groups among all UL-DL configurations (Config#0 to 6)" has been assumed, but, for example, when base station 100 indicates, to the plurality of TDD eIMTA terminals, a set of UL-DL configuration candidates that can be changed by TDD eIMTA (e.g., Config#0 to 2 in FIG. 13A) beforehand or when a set of UL-DL configuration candidates that can be changed by TDD eIMTA is predefined for SIB1-notified UL-DL configuration (e.g., only Config#0 to 2 are available to TDD eIMTA for SIB1-indicated Config#0 in FIG. 13A), the "maximum value of the factor of the number of PHICH groups among all UL-DL configurations (Config#0 to 2) that can be changed" may be used for the TDD eIMTA terminal. By determining the maximum value of the factor of the number of PHICH groups exclusively for some UL-DL configurations, base station 100 can secure PHICH resources using the total number of PHICH groups which is more suitable for each TDD eIMTA terminal and can thereby improve the resource utilization efficiency.

[PDCCH Detection Method and PHICH Detection Method]

Next, operations relating to PDCCH detection and PHICH detection by terminal 200 will be described.

(a) When the factor of the number of PHICH groups corresponding to UL-DL configuration for TDD eIMTA is 0 and the maximum value of the factor of the number of PHICH groups among all UL-DL configurations is 1.

In the subframes, terminal 200 secures, for PDCCH, a PHICH resource (number of PHICH resources and corresponding PHICH resource position) identified based on factor 1 of the number of PHICH groups (maximum value in the subframes) for PDCCH detection. However, since there is no PHICH intended for terminal 200, terminal 200 need not perform PHICH detection.

(b) When the factor of the number of PHICH groups corresponding to UL-DL configuration for TDD eIMTA is 1 and the maximum value of the factor of the number of PHICH groups among all UL-DL configurations is 1.

In the subframes, terminal 200 secures, for PDCCH, a PHICH resource (number of PHICH resources and corresponding PHICH resource position) identified based on factor 1 of the number of PHICH groups (maximum value in the subframes) for PDCCH detection. Furthermore, terminal 200 performs PHICH detection. Therefore, both adaptive retransmission and non-adaptive retransmission are available as the uplink data retransmission method for terminal 200.

(Method 3)

The total number of PHICH groups is determined based on the minimum value for each subframe in all UL-DL configurations. That is, at timings corresponding to case 2, base station 100 and terminal 200 use a minimum value among the factors of the numbers of PHICH groups defined for the timings of a plurality of UL-DL configurations. In other words, at timings corresponding to case 2, base station 100 and terminal 200 use a minimum value among the total numbers of PHICH groups associated with a plurality of UL-DL configurations respectively.

Note that the premise of method 3 is the same as that of method 2 (e.g., FIGS. 12A and 12B).

Figures 14A, 14B:
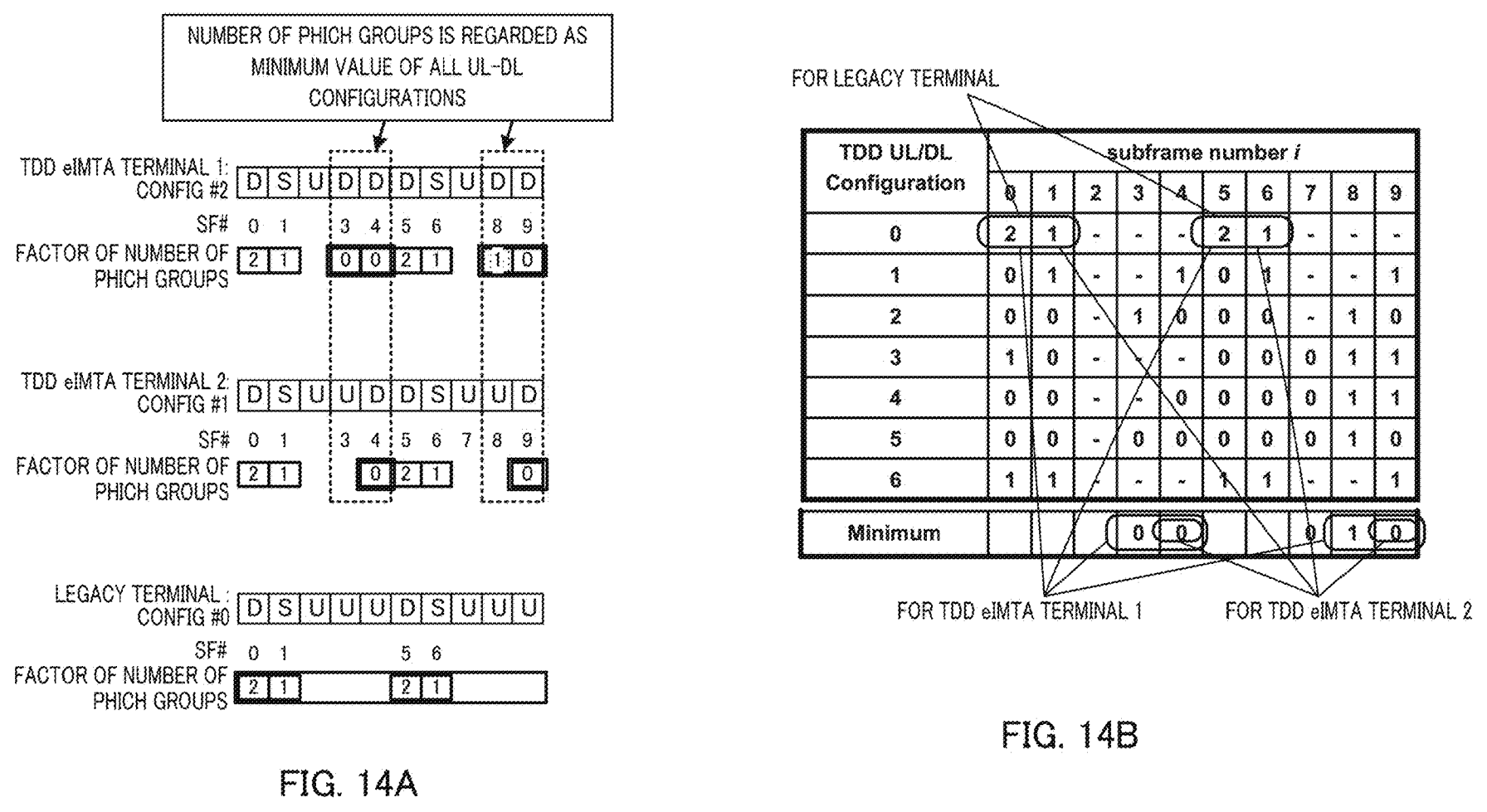

In method 3, as shown in FIG. 14A and FIG. 14B, when timings of the non-TDD eIMTA terminal (legacy terminal) are uplink communication subframes and timings of at least one of TDD eIMTA terminals in which mutually different UL-DL configurations for TDD eIMTA are set in all UL-DL configurations other than SIB1-indicated UL-DL configuration are downlink communication subframes or special subframes (subframes #3, 4, 7, 8 and 9 in FIG. 14A), and when base station 100 performs downlink communication (subframes #3, 4, 8 and 9 in FIG. 14A), base station 100 secures, for these TDD eIMTA terminals, PHICH resources (number of PHICH resources and PHICH resource positions) assuming the minimum value among the factors of the numbers of PHICH groups defined in all UL-DL configurations (Config#0 to 6) in the subframes as the factor of the number of PHICH groups in the subframes. When timings of SIB1-indicated UL-DL configuration are uplink communication subframes and timings of UL-DL configuration set in the terminal are downlink communication subframes or special subframes, terminal 200 (TDD eIMTA terminal) identifies the number of PHICH resources and corresponding PHICH resource positions assuming the minimum value among the factors of the numbers of PHICH groups defined in all UL-DL configurations (Config#0 to 6) in the subframes as the factor of the number of PHICH groups in the subframes and detects PDCCH.

For example, according to FIG. 14B, the factor of the number of PHICH groups in subframe #3 is 1 in Config#2 and 0 in Config#5, and therefore the minimum value is 0. Similarly, the factor of the number of PHICH groups in subframe #8 is always 1 in Config#2 to 5, and therefore the minimum value is 1. Moreover, the factor of the number of PHICH groups in subframe #7 is always 0 in Config#3 to 5, and therefore the minimum value is 0. The same applies to other subframes #4 and 9.

Note that method 3 is applicable to above-described two cases I and II.

Effects

In this way, as in the case of method 2, base station 100 can determine PHICH resources by eliminating differences in recognition of the total number of PHICH groups among a plurality of TDD eIMTAs. Thus, base station 100 can perform PDCCH scheduling for the plurality of TDD eIMTA terminals in the same subframe, and at the same time each TDD eIMTA terminal can detect PDCCH in the same subframe. It is also possible to prevent PHICH resources from being excessively secured for the TDD eIMTA terminal.

In the above description, the "minimum value of the factor of the number of PHICH groups among all UL-DL configurations (Config#0 to 6)" has been assumed, but, for example, when base station 100 notifies the plurality of TDD eIMTA terminals of a set of UL-DL configuration candidates that can be changed by TDD eIMTA (e.g., Config#0 to 2 in FIG. 14A) beforehand or when a set of UL-DL configuration candidates that can be changed by TDD eIMTA is predefined for SIB1-notified UL-DL configuration (e.g., only Config#0 to 2 are available to TDD eIMTA for SIB1-notified Config#0 in FIG. 14A), the "minimum value of the factor of the number of PHICH groups among all UL-DL configurations (Config#0 to 2) that can be changed" may be used for the TDD eIMTA terminal. In this case, in FIG. 14B, the factors of numbers of PHICH groups in subframes #3, 4, 8 and 9 are 1, 0, 1 and 0, respectively. Determining the minimum value of the factor of the number of PHICH groups exclusively for some UL-DL configurations allows base station 100 to secure PHICH resources using the total number of PHICH groups which is more suitable for each TDD eIMTA terminal, and can thereby improve the resource utilization efficiency.

(Method 4)

In method 4, the total number of PHICH groups is always 0. That is, in base station 100 and terminal 200, the demultiplexing section sets the factor of the number of PHICH groups to 0 at timings corresponding to case 2. In other words, base station 100 and terminal 200 set the total number of PHICH groups to 0 at timings corresponding to case 2.

Before describing method 4, premises and problems will be described using FIG. 15 and FIG. 16.

Figure 15:
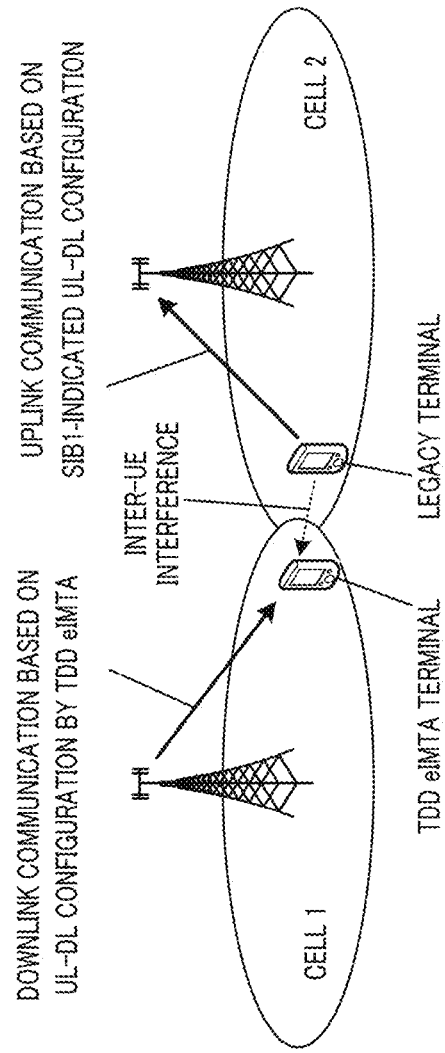
FIG. 15 is a diagram provided for describing problems associated with case 2 of the embodiment of the present invention.

As shown in FIG. 15, method 4 assumes that a non-TDD eIMTA terminal (legacy terminal) using SIB1-indicated UL-DL configuration is located in cell 2 adjacent to cell 1 to which a TDD eIMTA terminal is connected.

In FIG. 15, the TDD eIMTA terminal and the non-TDD eIMTA terminal (legacy terminal) are located in proximity to each other, but the terminals are connected to different cells. Here, suppose that the legacy terminal connected to cell 2 is performing uplink communication based on SIB1-indicated UL-DL configuration. At the same time, suppose that the TDD eIMTA terminal connected to cell 1 is performing downlink communication based on UL-DL configuration for TDD eIMTA.

At this time, since the TDD eIMTA terminal and the legacy terminal are located in proximity to each other, the legacy terminal provides large inter-terminal interference (inter-UE interference) to the TDD eIMTA terminal.

Figure 16:
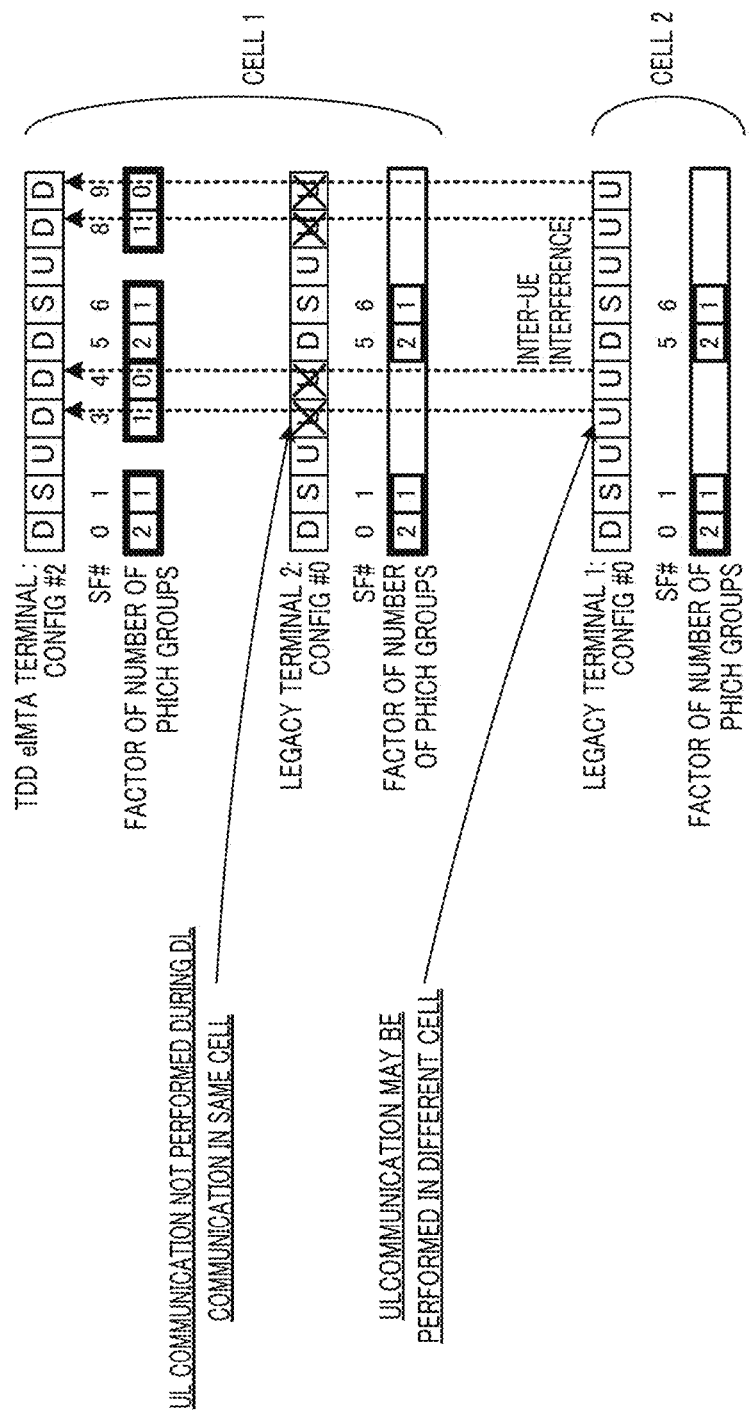
FIG. 16 is a diagram provided for describing problems associated with case 2 of the embodiment of the present invention.

FIG. 16 illustrates, in a time sequence of one frame, the case shown in FIG. 15 where inter-UE interference has occurred. Note that in FIG. 16, in addition to the TDD eIMTA terminal connected to cell 1 and legacy terminal 1 connected to cell 2, there is legacy terminal 2 connected to cell 1. In FIG. 16, it is assumed that the SIB-indicated UL-DL configuration is identical (Config#0) between cell 1 and cell 2.

Attention is focused on timings of legacy terminal 2 connected to cell 1 and legacy terminal 1 connected to cell 2 which are uplink communication subframes and timings of the TDD eIMTA terminal which are downlink communication subframes or special subframes (subframes #3, 4, 8 and 9 in FIG. 16). In this case, in cell 1, when the subframes are used for downlink communication, operation is performed such that legacy terminal 2 connected to cell 1 does not perform uplink communication. Meanwhile, in cell 1, even when the subframes are used for downlink communication, communication in cell 2 may be operated independently of cell 1, and therefore legacy terminal 1 connected to cell 2 may perform uplink communication. At this time, the TDD eIMTA terminal connected to cell 1 receives large inter-UE interference from legacy terminal 1 connected to cell 2.

At this time, the TDD eIMTA terminal is more likely to be unable to correctly receive PHICH and PDCCH in the subframes due to inter-UE interference. Meanwhile, as described above, since a CRC is added to UL grant, a received signal of UL grant has higher reliability than PHICH. For this reason, UL grant is more resistant to interference than PHICH.

Figure 17:
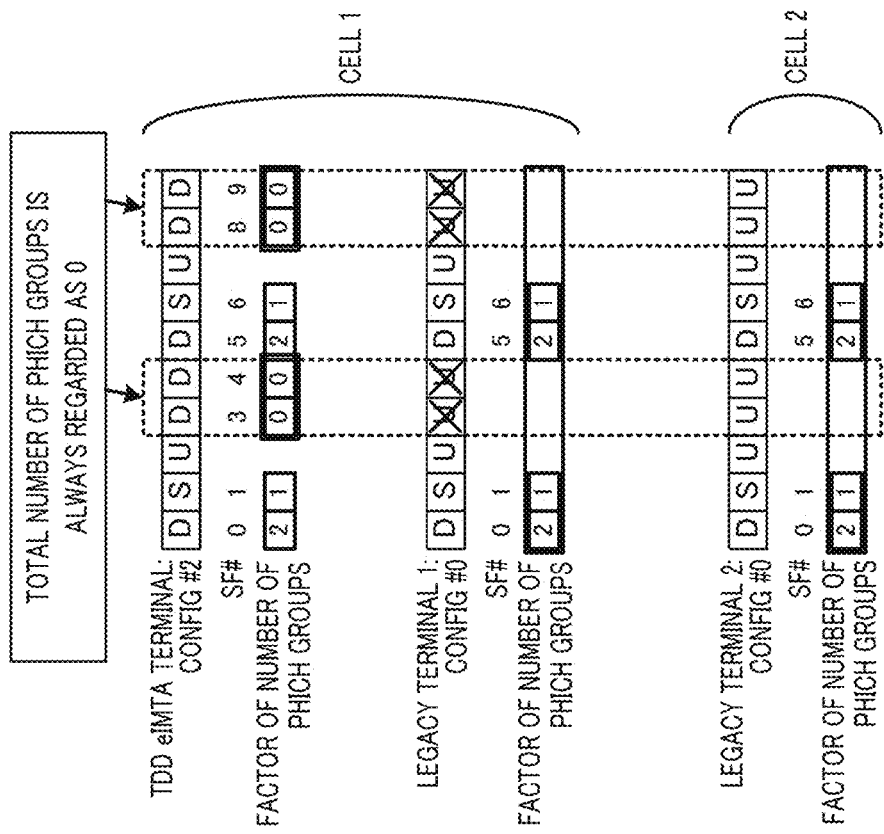
FIG. 17 is a diagram provided for describing factors of the numbers of PHICH groups according to method 4 of case 2 of the embodiment of the present invention.

Thus, in method 4, when timings of the non-TDD eIMTA terminal (legacy terminal) are uplink communication subframes and timings of the TDD eIMTA terminal (terminal 200) are downlink communication subframes or special subframes, base station 100 does not assign PHICH to terminal 200 and terminal 200 does not detect PHICH in the subframes. That is, since PHICH detection is not performed in the subframes, as shown in FIG. 17, base station 100 and terminal 200 set the factor of the number of PHICH groups for terminal 200 to 0 (total number of PHICH groups is 0). In this case, only adaptive retransmission is available as the uplink data retransmission method for terminal 200.

Effects

In this way, since only retransmission (adaptive retransmission) based on interference-resistant PDCCH is carried out for terminal 200 (TDD eIMTA terminal), it is possible to perform highly reliable uplink communication retransmission control even when aforementioned inter-UE interference occurs. Moreover, since it is not necessary to secure unnecessary PHICH resources for terminal 200, the resource utilization efficiency can be improved.

The embodiment of the present invention has been described so far.

Other Embodiments (1) In the above embodiment, as the method of indicating a UL-DL configuration for TDD eIMTA set in a TDD eIMTA terminal (terminal 200), one of the following indication methods may be adopted: method of indicating an RRC (higher layer) signaling base, method of indicating a MAC (Media Access Control layer) signaling base and method of indicating a L1 (Physical Layer) signaling base. When UL-DL configuration for TDD eIMTA set in a TDD eIMTA terminal is different from SIB1-notified UL-DL configuration used in a non-TDD eIMTA terminal (legacy terminal), the method of indicating an SI (System Information) signaling base may be adopted as the method of indicating UL-DL configuration for TDD eIMTA set in the TDD eIMTA terminal.

(2) "UL-DL configuration for TDD eIMTA set in a TDD eIMTA terminal" has been described in the above embodiment. However, this is based on the premise that "UL-DL configuration for TDD eIMTA set in the TDD eIMTA terminal" and "UL-DL configuration referencing timing relating to uplink control that defines the factor of the number of PHICH groups (that is, PHICH reception timing corresponding to uplink data (PUSCH)" are the same.

However, in an LTE-A system, according to TDD inter-band CA (Carrier Aggregation), when different UL-DL configurations are indicated among a plurality of component carriers to which carrier aggregation is applied, UL-DL configuration that indicates a subframe configuration within one frame may be different from UL-DL configuration referencing timing relating to uplink control (hereinafter, may also be referred to as "UL-DL configuration for timing reference").

When TDD inter-band CA is operated in combination with TDD eIMTA, "UL-DL configuration for TDD eIMTA set in the TDD eIMTA terminal" in the above embodiment is different from "UL-DL configuration for timing reference" referenced by the TDD eIMTA terminal. Therefore, in the above embodiment, the "UL-DL configuration for TDD eIMTA set in the TDD eIMTA terminal" may be regarded as "UL-DL configuration at timing relating to uplink control referenced by the TDD eIMTA terminal."

(3) Each of the embodiments has been described with antennas, but the present invention can be applied to antenna ports in the same manner.

The term "antenna port" refers to a logical antenna including one or more physical antennas. In other words, the term "antenna port" does not necessarily refer to a single physical antenna, and may sometimes refer to an array antenna formed of a plurality of antennas and/or the like.

For example, LTE does not specify the number of physical antennas forming an antenna port, but specifies an antenna port as a minimum unit allowing each base station to transmit a different reference signal.

In addition, an antenna port may be specified as a minimum unit for multiplication of precoding vector weighting.

(4) In the foregoing embodiments, the present invention is configured with hardware by way of example, but the present invention can be also implemented by software in conjunction with hardware.

In addition, the functional blocks used in the descriptions of the embodiments are typically implemented as LSI devices, which are integrated circuits. These functional blocks may be formed as individual chips, or part or all of the functional blocks may be integrated into a single chip. The term "LSI" is used herein, but the terms "IC," "system LSI," "super LSI" or "ultra LSI" may be used as well depending on the level of integration.

In addition, the circuit integration is not limited to LSI and may be achieved by dedicated circuitry or a general-purpose processor other than an LSI. After fabrication of LSI, a field programmable gate array (FPGA), which is programmable, or a reconfigurable processor, which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology and/or the like.

As has been descried above, a terminal apparatus according to the present disclosure is a terminal apparatus capable of changing setting of a configuration pattern of subframes which make up a single frame to one of a plurality of configuration patterns including a first subframe used for downlink communication and a second subframe used for uplink communication, the terminal apparatus including: a receiving section that receives a signal transmitted from a base station apparatus; and a demultiplexing section that demultiplexes the signal into a response signal assigned to a first resource identified based on a number of resources associated with the first subframe in which the signal has been received, and downlink control information assigned to a second resource, while a number of resources to which a response signal for uplink data is assigned is associated with the first subframe included in the configuration pattern, in which, when both timing of a first configuration pattern set in the terminal apparatus and timing of a second configuration pattern set in another terminal apparatus whose setting of a configuration pattern cannot be changed are the first subframes, the demultiplexing section uses a number of resources associated with the first subframe of the second configuration pattern.

In the terminal apparatus according to the disclosure, when the timing of the first configuration pattern is the first subframe and the second configuration pattern is the second subframe, the demultiplexing section uses the number of resources associated with the first subframe of the first configuration pattern.

In the terminal apparatus according to the disclosure, when the timing of the first configuration pattern is the first subframe and the second configuration pattern is the second subframe, the demultiplexing section uses a maximum value of the numbers of resources associated with the first subframes of the plurality of configuration patterns, respectively.

In the terminal apparatus according to the disclosure, when the timing of the first configuration pattern is the first subframe and the second configuration pattern is the second subframe, the demultiplexing section uses a minimum value of the numbers of resources associated with the first subframes of the plurality of configuration patterns, respectively.

In the terminal apparatus according to the disclosure, when the timing of the first configuration pattern is the first subframe and the second configuration pattern is the second subframe, the demultiplexing section sets the number of resources to 0.

A base station apparatus according to the present disclosure includes: a generation section that generates a response signal for uplink data transmitted from a terminal apparatus in which one of a plurality of configuration patterns including a first subframe used for downlink communication and a second subframe used for uplink communication is set, each configuration pattern including subframes which make up one frame; an assignment section that assigns a response signal to a first resource identified based on a number of resources associated with the first subframe in which the response signal is transmitted, and downlink control information to a second resource, while a number of resources to which a response signal for uplink data is assigned is associated with the first subframe included in the configuration pattern; and a transmitting section that transmits a signal including the response signal and the downlink control information, in which, when both timing of a first configuration pattern set in the terminal apparatus and timing of a second configuration pattern set in another terminal apparatus whose setting of a configuration pattern cannot be changed are the first subframes, the assignment section uses a number of resources associated with the first subframe of the second configuration pattern for the terminal apparatus.

A reception method according to the present disclosure is a method for a terminal apparatus capable of changing setting of a configuration pattern of subframes which make up a single frame to one of a plurality of configuration patterns including a first subframe used for downlink communication and a second subframe used for uplink communication, the method including: receiving a signal transmitted from a base station apparatus; and demultiplexing the signal into a response signal assigned to a first resource identified based on a number of resources associated with the first subframe in which the signal has been received, and downlink control information assigned to a second resource, while a number of resources to which a response signal for uplink data is assigned is associated with the first subframe included in the configuration pattern, in which, when both timing of a first configuration pattern set in the terminal apparatus and timing of a second configuration pattern set in another terminal apparatus whose setting of a configuration pattern cannot be changed are the first subframes, a number of resources associated with the first subframe of the second configuration pattern is used.

A transmission method according to the present disclosure includes: generating a response signal for uplink data transmitted from a terminal apparatus in which one of a plurality of configuration patterns including a first subframe used for downlink communication and a second subframe used for uplink communication is set, each configuration pattern including subframes which make up one frame; assigning a response signal to a first resource identified based on a number of resources associated with the first subframe in which the response signal is transmitted, and downlink control information to a second resource, while a number of resources to which a response signal for uplink data is assigned is associated with the first subframe included in the configuration pattern; transmitting a signal including the response signal and the downlink control information; and using, when both timing of a first configuration pattern set in the terminal apparatus and timing of a second configuration pattern set in another terminal apparatus whose setting of a configuration pattern cannot be changed are the first subframes, a number of resources associated with the first subframe of the second configuration pattern for the terminal apparatus.

The disclosure of Japanese Patent Application No. 2012-236768, filed on Oct. 26, 2012, including the specification, drawings and abstract is incorporated herein by reference in its entirety.

INDUSTRIAL APPLICABILITY

The present invention is useful in mobile communication systems, for example.

REFERENCE SIGNS LIST

100 Base station
200 Terminal
101 Error determining section
102 Control information generation section
103 PHICH generation section
104, 208 Error correction coding section
105, 209 Modulation section
106, 210 Signal assignment section
107, 211 Radio transmitting section
108, 201 Antenna
109, 202 Radio receiving section
110, 204 Demodulation section
111, 205 Error correction decoding section
203 Signal demultiplexing section
206 PHICH receiving section
207 Control information receiving section

The invention claimed is:

1. A terminal apparatus that supports TDD eIMTA (time division duplex enhancement for DL-UL interference management and traffic adaptation), comprising:
  a receiver which, in operation, receives a first UL-DL (uplink-downlink) configuration configured for TDD eIMTA terminals, a second UL-DL configuration indicated in a broadcast signal, and a response signal for uplink data in a PHICH (physical hybrid ARQ indicator channel);
  control circuitry which, in operation, identifies a number of PHICH groups, the number of PHICH groups being based on a factor for the number of PHICH groups for a subframe defined in the second UL-DL configuration and not in the first UL-DL configuration, and detects the response signal in the identified number of PHICH groups; and
  a transmitter which, in operation, retransmits the uplink data based on the detected response signal.

2. The terminal apparatus of claim 1, wherein the control circuity, in operation, connects to a cell that supports TDD eIMTA using the second UL-DL configuration.

3. The terminal apparatus of claim 2, wherein the control circuitry switches to use the first UL-DL configuration after connecting to the cell.

4. The terminal apparatus of claim 1, wherein the second UL-DL configuration is set for both a legacy terminal that does not support the first UL-DL configuration and an TDD eIMTA terminal that supports the first UL-DL configuration.

5. The terminal apparatus of claim 1, wherein the second UL-DL configuration is indicated in System Information Block Type 1 (SIB1).

6. The terminal apparatus of claim 1, wherein the second UL-DL configuration is not changed frequently.

7. The terminal apparatus of claim 1, wherein the first UL-DL configuration is dynamically signaled by a higher layer.

8. The terminal apparatus of claim 1, wherein the first UL-DL configuration is flexibly changed.

9. A radio communication method implemented in a terminal apparatus that supports TDD eIMTA (time division duplex enhancement for DL-UL interference management and traffic adaptation), the method comprising:
receiving a first UL-DL (uplink-downlink) configuration configured for TDD eIMTA terminals, a second UL-DL configuration indicated in a broadcast signal, and a response signal for uplink data in a PHICH (physical hybrid ARQ indicator channel);
identifying a number of PHICH groups, the number of PHICH groups being based on a factor for the number of PHICH groups for a subframe defined in the second UL-DL configuration and not in the first UL-DL configuration;
detecting the response signal in the identified number of PHICH groups; and
retransmitting the uplink data based on the detected response signal.

10. The method of claim 9, further comprising:
connecting to a cell that supports TDD eIMTA using the second UL-DL configuration.

11. The method of claim 10, further comprising:
using the first UL-DL configuration after connecting to the cell.

12. The method of claim 9, wherein the second UL-DL configuration is set for both a legacy terminal that does not support the first UL-DL configuration and an TDD eIMTA terminal that supports the first UL-DL configuration.

13. The method of claim 9, wherein the second UL-DL configuration is indicated in System Information Block Type 1 (SIB1).

14. The method of claim 9, wherein the second UL-DL configuration is not changed frequently.

15. The method of claim 9, wherein the first UL-DL configuration is dynamically signaled by a higher layer.

16. The method of claim 9, wherein the first UL-DL configuration is flexibly changed.

17. An integrated circuit for controlling operation of a terminal apparatus that supports TDD eIMTA (time division duplex enhancement for DL-UL interference management and traffic adaptation), the integrated circuit comprising:
reception circuitry which, in operation, controls reception of a first UL-DL (uplink-downlink) configuration configured for TDD eIMTA terminals, a second UL-DL configuration indicated in a broadcast signal, and a response signal for uplink data in a PHICH (physical hybrid ARQ indicator channel);
control circuitry which, in operation, controls identification of a number of PHICH groups, the number of PHICH groups being based on a factor for the number of PHICH groups for a subframe defined in the second UL-DL configuration and not in the first UL-DL configuration, and controls detection of the response signal in the identified number of PHICH groups; and
transmission circuitry which, in operation, controls retransmission of the uplink data based on the detected response signal.

18. The integrated circuit of claim 17, wherein the control circuitry, in operation, controls connection to a cell that supports TDD eIMTA using the second UL-DL configuration.

19. The integrated circuit of claim 18, wherein the control circuitry, in operation, controls use of the first UL-DL configuration after connecting to the cell.

20. The integrated circuit of claim 17, wherein the second UL-DL configuration is set for both a legacy terminal that does not support the first UL-DL configuration and an TDD eIMTA terminal that supports the first UL-DL configuration.

21. The integrated circuit of claim 17, wherein the second UL-DL configuration is indicated in System Information Block Type 1 (SIB1).

22. The integrated circuit of claim 17, wherein the second UL-DL configuration is not changed frequently.

23. The integrated circuit of claim 17, wherein the first UL-DL configuration is dynamically signaled by a higher layer.

24. The integrated circuit of claim 17, wherein the first UL-DL configuration is flexibly changed.

* * * * *